(12) United States Patent
Behr et al.

(10) Patent No.: US 9,631,755 B2
(45) Date of Patent: *Apr. 25, 2017

(54) IMPLEMENT INTERFACE

(71) Applicant: Clark Equipment Company, West Fargo, ND (US)

(72) Inventors: Eric J. Behr, Oakes, ND (US); Brandon Becker, Fargo, ND (US); Mark W. Binstock, Bismarck, ND (US)

(73) Assignee: Clark Equipment Company, West Fargo, ND (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/193,265

(22) Filed: Feb. 28, 2014

(65) Prior Publication Data
US 2015/0020892 A1    Jan. 22, 2015

Related U.S. Application Data

(60) Provisional application No. 61/846,841, filed on Jul. 16, 2013.

(51) Int. Cl.
*E02F 3/36* (2006.01)
*F16L 37/08* (2006.01)

(52) U.S. Cl.
CPC .............. *F16L 37/08* (2013.01); *E02F 3/364* (2013.01); *E02F 3/3627* (2013.01);
(Continued)

(58) Field of Classification Search
CPC ....... E02F 3/364; E02F 3/3654; E02F 3/3663; E02F 9/2275; E02F 9/2271; E02F 9/2267;
(Continued)

(56) References Cited

U.S. PATENT DOCUMENTS 3,243,066 A    3/1966  Gardner et al.
4,664,588 A    5/1987  Newell et al.
(Continued)

FOREIGN PATENT DOCUMENTS

CH         701819        3/2011
DE     102005027807    12/2006
(Continued)

OTHER PUBLICATIONS

Invitation to Pay Additional Fees dated Jun. 4, 2014 for International Application No. PCT/US2014/019286, filed Feb. 28, 2014, 8 pages.
(Continued)

*Primary Examiner* — Robert Pezzuto
(74) *Attorney, Agent, or Firm* — John D. Veldhuis-Kroeze; Westman, Champlin & Koehler, P.A.

(57) ABSTRACT

A carrier for an implement that can be operably coupled to a power machine. In one example, an implement carrier can be mountable to a power machine for securing an implement for use with the power machine. The implement carrier can include an implement carrier frame, a locking feature for securing an implement, and a coupler block that is pivotally mounted to the implement carrier frame for engaging couplers on the implement.

52 Claims, 24 Drawing Sheets

(52) U.S. Cl.
CPC .......... *E02F 3/3654* (2013.01); *E02F 3/3663* (2013.01); *E02F 3/3668* (2013.01); *E02F 3/3672* (2013.01); *Y10T 137/0447* (2015.04); *Y10T 137/9029* (2015.04)

(58) Field of Classification Search
CPC ..... E02F 3/3627; E02F 3/3668; E02F 3/3672; F16L 37/08; Y10T 137/0447; Y10T 137/9029
USPC ................. 37/466, 468, 403; 172/272–274; 414/723, 724; 91/432; 403/321
See application file for complete search history.

(56) References Cited

U.S. PATENT DOCUMENTS

| | | | |
|---|---|---|---|
| 5,002,444 A | 3/1991 | Chomel | |
| 5,141,386 A | 8/1992 | Barwise | |
| 5,316,347 A * | 5/1994 | Arosio | 285/26 |
| 5,333,400 A | 8/1994 | Sonerud | |
| 5,360,313 A | 11/1994 | Gilmore, Jr. et al. | |
| 5,829,337 A | 11/1998 | Barden | |
| 6,196,265 B1 | 3/2001 | Horton et al. | |
| 6,196,595 B1 * | 3/2001 | Sonerud | E02F 3/3631 |
| | | | 285/26 |
| 6,230,740 B1 | 5/2001 | Horton et al. | |
| 6,301,811 B1 | 10/2001 | Gilmore, Jr. | |
| 6,405,815 B1 | 6/2002 | Stoever et al. | |
| 6,428,265 B1 | 8/2002 | Gilmore, Jr. | |
| 6,773,223 B2 | 8/2004 | Harris et al. | |
| 6,813,851 B2 | 11/2004 | Mieger et al. | |
| 6,866,467 B2 | 3/2005 | Dvorak et al. | |
| 6,899,509 B1 | 5/2005 | Mailleux | |
| 7,047,866 B2 | 5/2006 | Fatemi et al. | |
| 7,290,977 B2 | 11/2007 | Albright et al. | |
| 7,367,256 B2 | 5/2008 | Fatemi et al. | |
| 7,426,796 B2 | 9/2008 | Cunningham et al. | |
| 7,464,967 B2 | 12/2008 | Mieger et al. | |
| 7,654,019 B2 | 2/2010 | Yeager et al. | |
| 7,686,563 B2 * | 3/2010 | Frey | E02F 3/3627 |
| | | | 37/468 |
| 7,735,249 B2 | 6/2010 | Muller | |
| 7,861,642 B2 | 1/2011 | Sonerud | |
| 7,963,054 B2 | 6/2011 | Wimmer et al. | |
| 8,281,502 B2 | 10/2012 | Haimerl | |
| 2002/0157287 A1 | 10/2002 | Mieger et al. | |
| 2009/0051163 A1 | 2/2009 | Frey et al. | |
| 2010/0052312 A1 | 3/2010 | Martin | |
| 2011/0262212 A1 | 10/2011 | Luyendijk et al. | |
| 2013/0177376 A1 | 7/2013 | Van Hooft et al. | |
| 2013/0177377 A1 | 7/2013 | Van Hooft et al. | |
| 2013/0181150 A1 | 7/2013 | Van Hooft et al. | |
| 2013/0199644 A1 | 8/2013 | Van Hooft et al. | |

FOREIGN PATENT DOCUMENTS

| | | |
|---|---|---|
| EP | 0976962 | 2/2000 |
| EP | 1813730 | 8/2007 |
| FR | 2886372 | 12/2006 |

OTHER PUBLICATIONS

Search Report and Written Opinion dated Sep. 30, 2014 for International Application No. PCT/US2014/019286, filed Feb. 28, 2014, 23 pages.

\* cited by examiner

IMPLEMENT INTERFACE

CROSS REFERENCE TO RELATED APPLICATION

The present application is based on and claims the benefit of U.S. provisional patent application Ser. No. 61/846,841, filed Jul. 16, 2013, the content of which is hereby incorporated by reference in its entirety.

BACKGROUND

This application is directed towards power machines. More particularly, this application is directed toward operably coupling implements to power machines. Power machines, for the purposes of this disclosure, include any type of machine that generates power for the purpose of accomplishing a particular task or a variety of tasks. One type of power machine is a work vehicle. Work vehicles are generally self-propelled vehicles that have a work device, such as a lift arm (although some work vehicles can have other work devices) that can be manipulated to perform a work function. Some examples of work vehicle power machines include loaders, excavators, utility vehicles, tractors, and trenchers, to name a few.

Some power machines can be operably coupled to implements that are capable of cooperating with the power machine to perform various tasks. For example, some loaders have lift arms that are capable of having a wide variety of implements operably coupled to them, ranging from a simple bucket or blade to relatively complex implements such as planers and graders that have work devices capable of performing various tasks. Some of these work devices on implements are controllable by operator input devices on the power machines to which they are operably coupled. Many power machines of this type are capable of providing power and/or control signals to an operably coupled implement. Thus, when a particular power machine is operably coupled to an implement, a connection is made between one or more power and/or control signal sources on the power machine and the implement. One common type of power source on such types of power machines is a hydraulic power source. Pressurized hydraulic fluid is selectively provided from the power machine to the implement once the connection is made.

The discussion above is merely provided for general background information and is not intended to be used as an aid in determining the scope of the claimed subject matter.

SUMMARY

This document discloses an interface for an implement that is to be operably coupled to a power machine. In one embodiment, an implement carrier is disclosed. The implement carrier is configured to be mounted to a power machine and receive and secure an implement for use with the power machine. The implement carrier includes an implement carrier frame, a locking feature for securing an implement to the implement carrier frame, and a coupler block that is configured to be engaged with couplers on the implement to provide power to the implement. The coupler block has a plurality of couplers mounted in it for engagement with couplers on an implement and it is pivotally mounted to the implement carrier frame.

In another embodiment, a power machine having an implement carrier is disclosed. The power machine has a frame, a power source supported by the frame, and a lift arm pivotally mounted to the frame. The implement carrier is pivotally mounted to the lift arm and is configured to receive and secure an implement for use with the power machine. The implement carrier includes a plurality of couplers that are configured to be engaged with the implement to provide a power signal from the source to the implement. A locking mechanism is provided for securing the implement to the implement carrier. The power machine is further disclosed in combination with an implement.

In another embodiment, a method of interfacing an implement with a power machine is disclosed. The method includes providing an implement carrier on the power machine capable of engaging and securing the implement to the power machine. The implement carrier has a frame, a coupler assembly housing a plurality of couplers that provide a power source to the implement and a locking actuator for securing the implement to the implement carrier. The coupler assembly is positioned on a back side of the frame and the couplers being accessible from a front side of the frame. The method further includes aligning the implement carrier with and engaging the implement, aligning the coupler assembly with couplers on the implement, and actuating the locking actuator to secure the implement to the implement carrier.

This Summary and the Abstract are provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

The concepts disclosed in this discussion are described and illustrated with reference to exemplary embodiments. These concepts, however, are not limited in their application to the details of construction and the arrangement of components in the illustrative embodiments and are capable of being practiced or being carried out in various other ways. The terminology in this document is used for the purpose of description and should not be regarded as limiting. Words such as "including," "comprising," and "having" and variations thereof as used herein are meant to encompass the items listed thereafter, equivalents thereof, as well as additional items.

Figure 1:
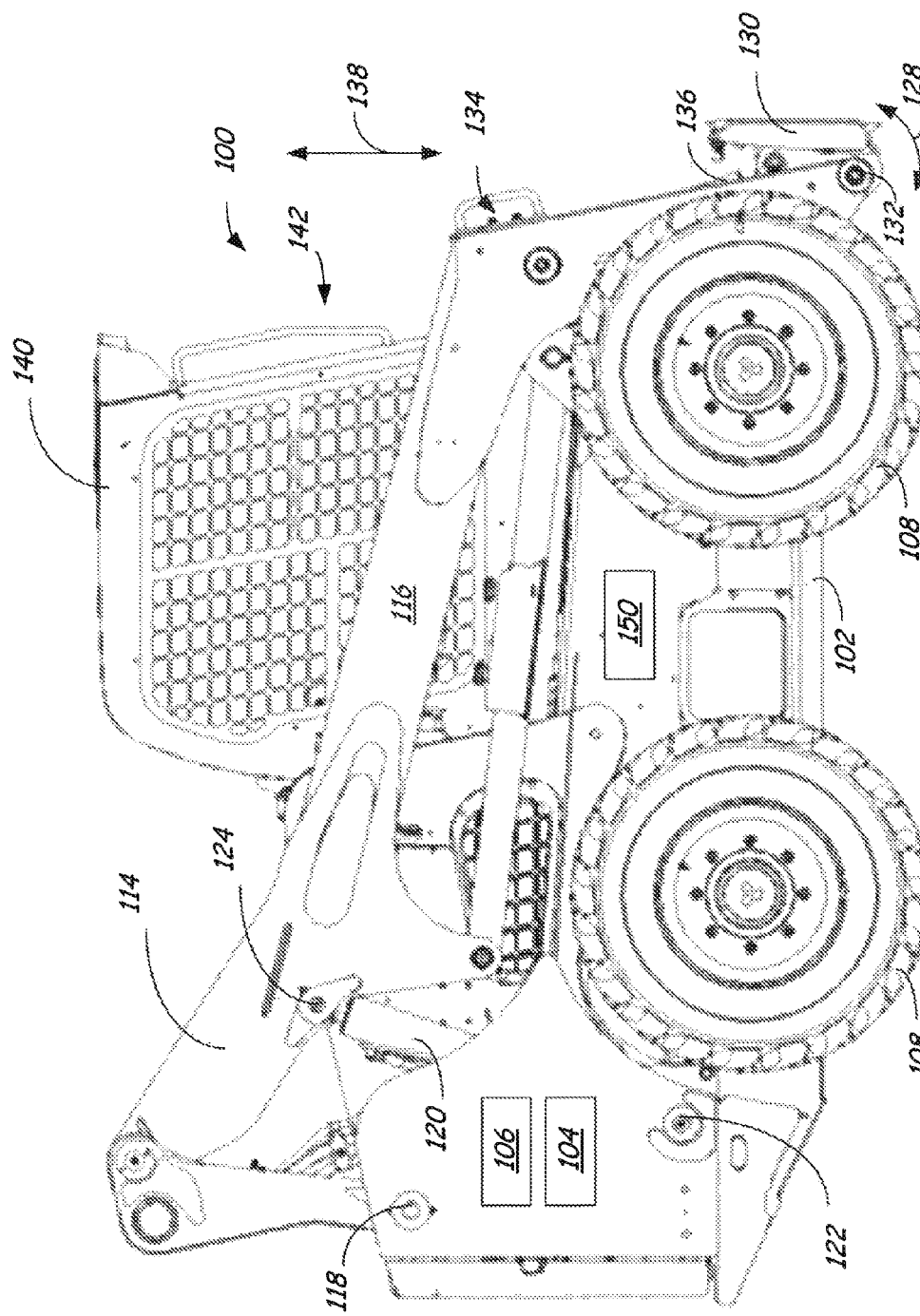
FIG. 1 is a side elevation view of a representative power machine of the type on which the disclosed embodiments can be practiced.
Figure 2:
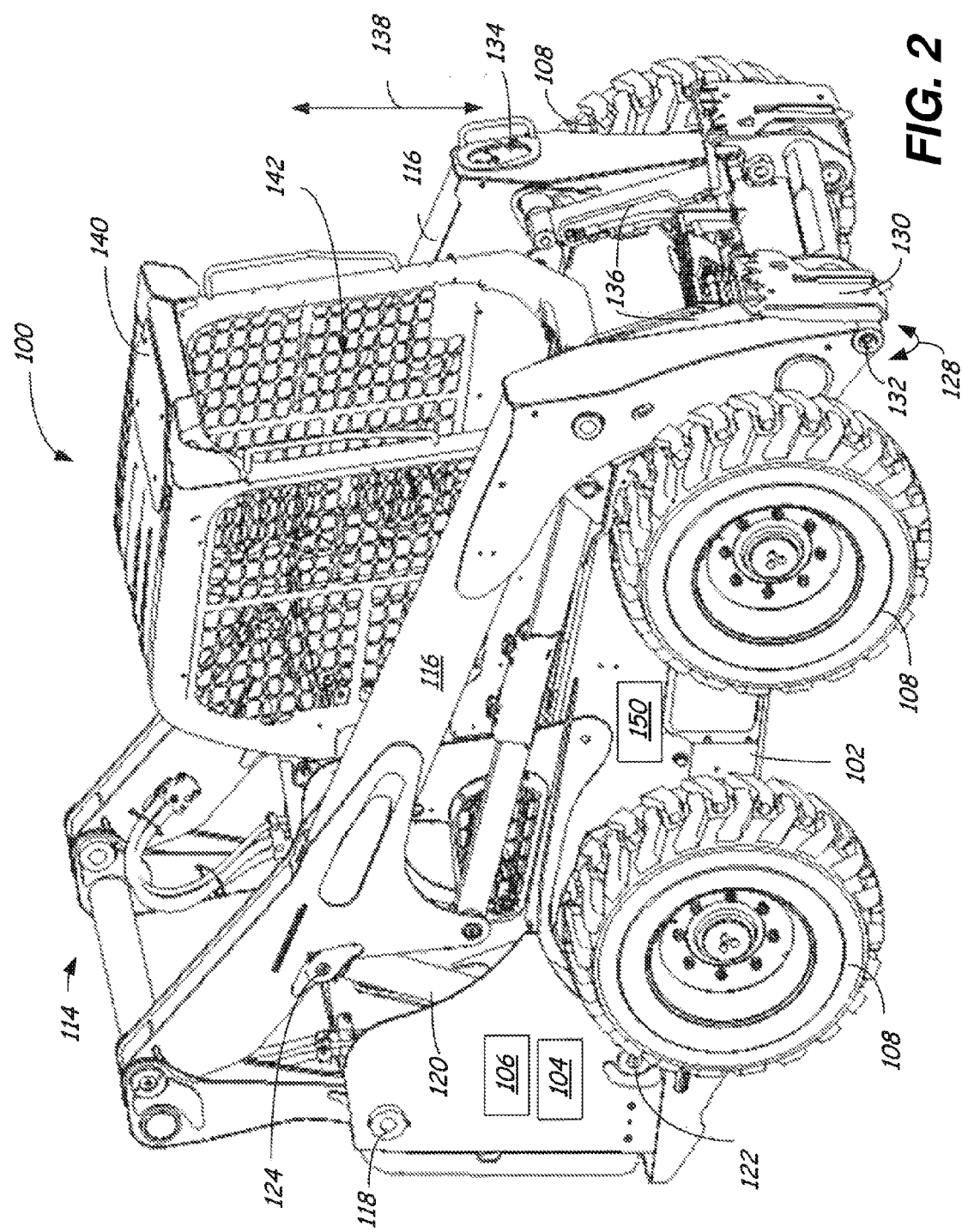
FIG. 2 is a perspective view of the representative power machine of FIG. 1, showing a prior art implement carrier.

Inventive concepts are set forth in embodiments discussed below. The embodiments are directed toward power machines, implements that are designed to be operably coupled to power machines, and connection systems and methods for connecting one or more power sources on the power machine to the implement. More particularly, the embodiments discussed below are directed toward connection systems and methods for connecting one or more power sources on the power machine to the implement by making a connection through an implement carrier on the power machine. For the purposes of this discussion, a representative power machine on which the embodiments can be practiced is illustrated in FIGS. 1-2 and described below before any embodiments are disclosed. For the sake of brevity, only one representative power machine is discussed. However, as mentioned above, the embodiments below can be practiced on any of a number of power machines, including power machines of different types from the representative power machine discussed below. In particular, the embodiments disclosed below can be practiced on power machines having different sized and shaped implement carriers than the ones shown in the representative power machine.

FIG. 1 is a side elevation view and FIG. 2 is a perspective view of a representative power machine 100 upon which the disclosed embodiments can be employed. While certain features of power machine 100 are discussed here, other power machines have other features besides those discussed with regard to power machine 100 or variations of the features of power machines on which the disclosed embodiments can be practiced. The representative power machine 100 is a work vehicle in the form of a loader and more particularly, a skid steer loader. However, the concepts discussed below can be practiced on many other types of work vehicles such as tracked loaders, steerable wheeled loaders, including all-wheel steer loaders, excavators, telehandlers, walk behind loaders, trenchers, and utility vehicles, to name but a few examples as well as many other different types of power machines. The power machine 100 includes a supporting frame or main frame 102 that supports a power source 104 such as an internal combustion engine. A power conversion system 106 is operably coupled to the power source 104. Power conversion system 106 illustratively receives power from the power source 104 and control signals from operator inputs to convert the received power into power signals in a form that is provided to and utilized by functional components of the power machine.

In some power machines, including power machine 100, the power conversion system 106 includes hydraulic components such as one or more hydraulic pumps, various actuators, and other components that are illustratively employed to receive and selectively provide power signals in the form of pressurized hydraulic fluid to some or all of the actuators used to control functional components of the power machine 100. For example, a control valve assembly (not separately shown) is used to selectively provide pressurized hydraulic fluid from a hydraulic pump to actuators such as hydraulic cylinders that are positioned on the power machine. Power conversion system 106 also selectively provides pressurized hydraulic fluid, to a port 134, to which an implement can be coupled for receiving pressurized hydraulic fluid. Other power machines upon which the disclosed embodiments can be practiced can employ other power conversion systems. For example, some power machines have power conversion systems that include electric generators or the like to generate electrical control signals to power electric actuators. Still other power machines have mechanical transmissions that act as a power conversion system, at least so far as a drive system is concerned.

Among the functional components that are capable of receiving power signals from the power conversion system 106 are tractive elements 108, illustratively shown as wheels, which are configured to rotatably engage a support surface to cause the power machine to travel. Other examples of power machines can have tracks or other tractive elements instead of wheels. Power machine 100 has a pair of hydraulic motors (not shown in FIGS. 1-2) that convert a hydraulic power signal into a rotational output. In some power machines, such as skid steer loaders including power machine 100, a single hydraulic motor is operably coupled to all of the tractive elements on one side of the power machine. Other power machines have, a hydraulic motor provided for each of its tractive elements. Still other machines have a single drive motor that is operably coupled to every driven tractive element. In a skid steer loader, such as power machine 100, steering is accomplished by providing unequal rotational outputs to the tractive element or elements on one side of the machine as opposed to the other side to cause the loader to skid across a support surface. In some power machines, steering is accomplished through other means, such as, for example, steerable axles.

The power machine 100 also includes a lift arm structure 114 that is capable of being raised and lowered with respect to the frame 102. The lift arm structure 114 illustratively includes a pair of lift arms 116 that are pivotally coupled to the frame 102 at pivotable joints 118 located on either side of the frame along an axis that is perpendicular to the frame. A pair of actuators 120 (only one is shown in FIGS. 1-2), which in some embodiments are hydraulic cylinders configured to receive pressurized fluid from power conversion system 106, are pivotally coupled to both the frame 102 and the lift arms 116 at pivotable joints 122 and 124, respectively on either side of the power machine 100. The actuators 120 are sometimes referred to individually and collectively as lift cylinders. Extension and retraction of the actuators 120 cause the lift arms 116 to pivot about pivotable joints 118 and thereby be raised and lowered along a generally vertical path. Arrow 138 provides an indication of a general path of an end of the lift arms 116 as they are raised and lowered. The lift arm structure 114 is representative of the type of lift arm structure that may be coupled to the power machine 100. Other lift arm structures, with different geometries, components, and arrangements can be coupled to the power machine 100 or other power machines upon which the embodiments discussed herein can be practiced without departing from the scope of the present discussion.

An implement carrier 130 is pivotally coupled to the lift arms 116 along an axis that runs through pivotable joints 132. The implement carrier 130 is configured to accept and secure any one of a plurality of different types of implements thereto. By having an implement carrier capable of being attached to a plurality of different implements, changing from one implement to another can be accomplished with relative ease. For example, machines with implement carriers can provide an actuator between the implement carrier and the lift arm structure, so that removing or attaching an implement does not involve removing or attaching an actuator from the implement. The implement carrier 130 provides a mounting structure for easily attaching an implement to the lift arm (or other portion of a power machine) that a lift arm structure without an implement carrier does not have.

One or more actuators such as hydraulic cylinders 136 are pivotally coupled to the implement carrier 130 and the lift arm structure 114 to cause the implement carrier 130 to rotate under power about an axis that extends through the pivotable joint 132 in an arc approximated by arrow 128 in response to operator input. In some embodiments, the one or more actuators pivotally coupled to the implement carrier and the lift arm assembly are hydraulic cylinders capable of receiving pressurized hydraulic fluid from the power conversion system 106. The one or more hydraulic cylinders 136 are sometimes referred to as tilt cylinders. As mentioned above, the implement carrier 130 is configured to accept and secure any one of a number of different implements to the power machine 100 as may be desired to accomplish a particular work task.

Power machine 100 provides a source, accessible at port 134 mentioned above, of power and control signals that is made available for coupling to an implement to control various functions on such an implement, in response to operator inputs. In one embodiment, port 134 includes hydraulic couplers that are connectable to an implement for providing power signals in the form of pressurized fluid provided by the power conversion system 106 for use by the implement. Alternatively or in addition, port 134 includes electrical connectors that can provide power signals and control signals to the implement to control and enable actuators of the type described above to control operation of functional components on the implement.

Power machine 100 also illustratively includes a cab 140 that is supported by the frame 102 and defines, at least in part, an operator compartment 142. Operator compartment 142 typically includes an operator seat (not shown) and operator input devices (not shown) and display devices (not shown) accessible and viewable from a sitting position in the seat. When an operator is seated properly within the operator compartment 142, the operator can manipulate operator input devices to control such functions as driving the power machine 100, raising and lowering the lift arm structure 114, rotating the implement carrier 130 about the lift arm structure 114 and make power and control signals available to an implement via the sources available at port 134. An electronic controller 150 is provided for receiving inputs from operator input devices and providing control signals to functional devices on the power machine 100. The electronic controller 150 shown in FIG. 1 can be any form of electronic controller or controllers capable of processing inputs and providing control signals. While an electronic controller 150 is shown in FIG. 1, some power machines upon which the embodiments described below can be practiced may not include any sort of electronic controller.

As discussed above, the implement carrier 130 is capable of accepting and securing any of a number of different implements for use to accomplish various tasks. The implement carrier 130 and implements capable of being secured to the implement carrier 130 provide for flexibility of use of power machine 100, thereby allowing an operator to perform many different tasks with the same power machine. Implement carriers of this type are generally known and an example of an implement carrier for a loader is shown in U.S. Pat. No. 3,672,521 of Bauer et al. and an example of an implement carrier for an excavator is shown in U.S. Pat. No. 5,974,706 of Kaczmarski et al. Because the implement carrier 130 is designed to accept and secure different implements by engaging attachment features (described below), implements can be attached to and removed from the power machine quickly and without the use of tools. In certain jobs, an operator may repeatedly change implements (i.e., remove one implement and attach another) during a given work event to perform various tasks.

Figure 3:
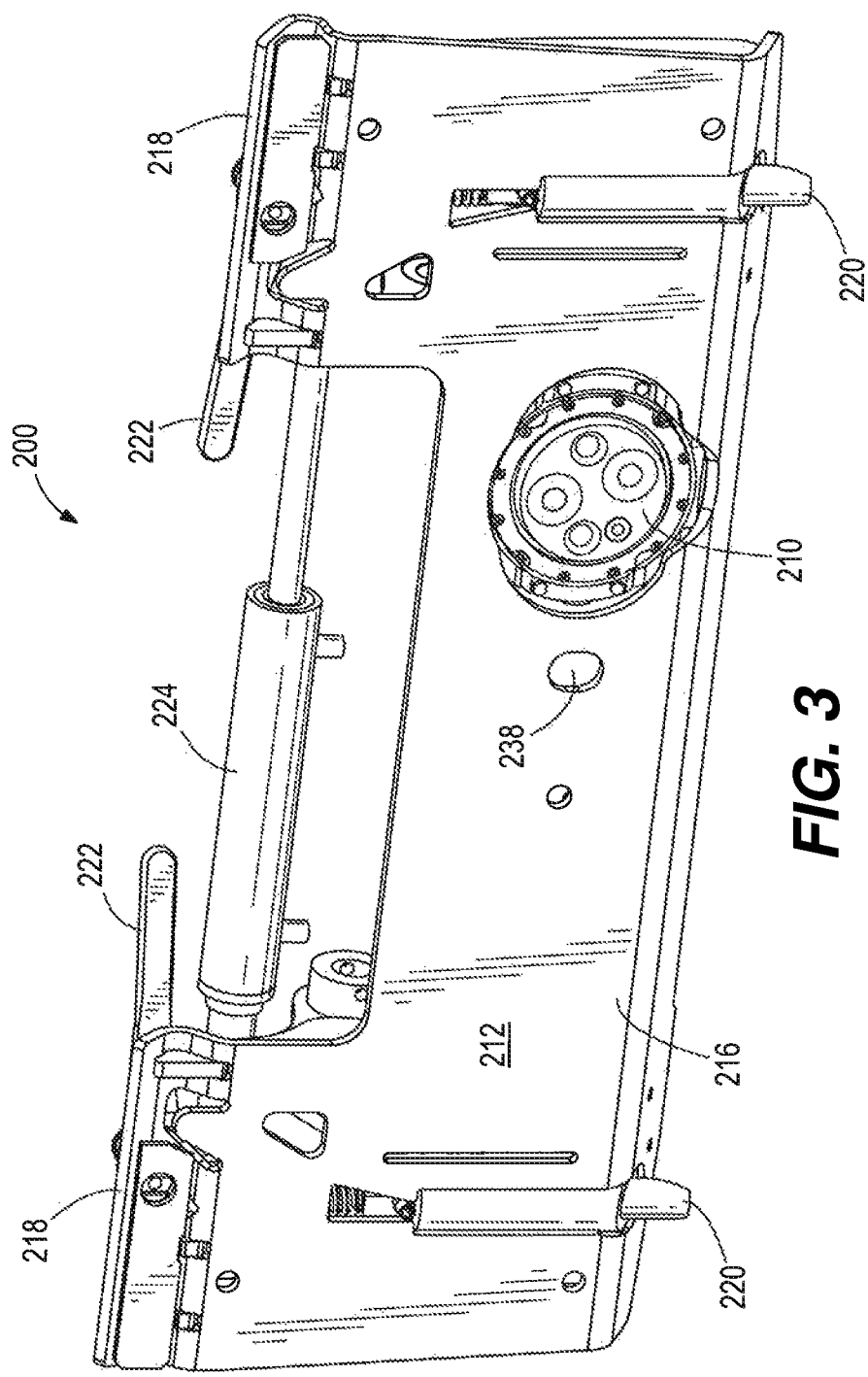
FIG. 3 is a perspective view showing a first side of an implement carrier having a coupler block for providing a connection between a power source on a power machine and an implement according to one illustrative embodiment.
Figure 4:
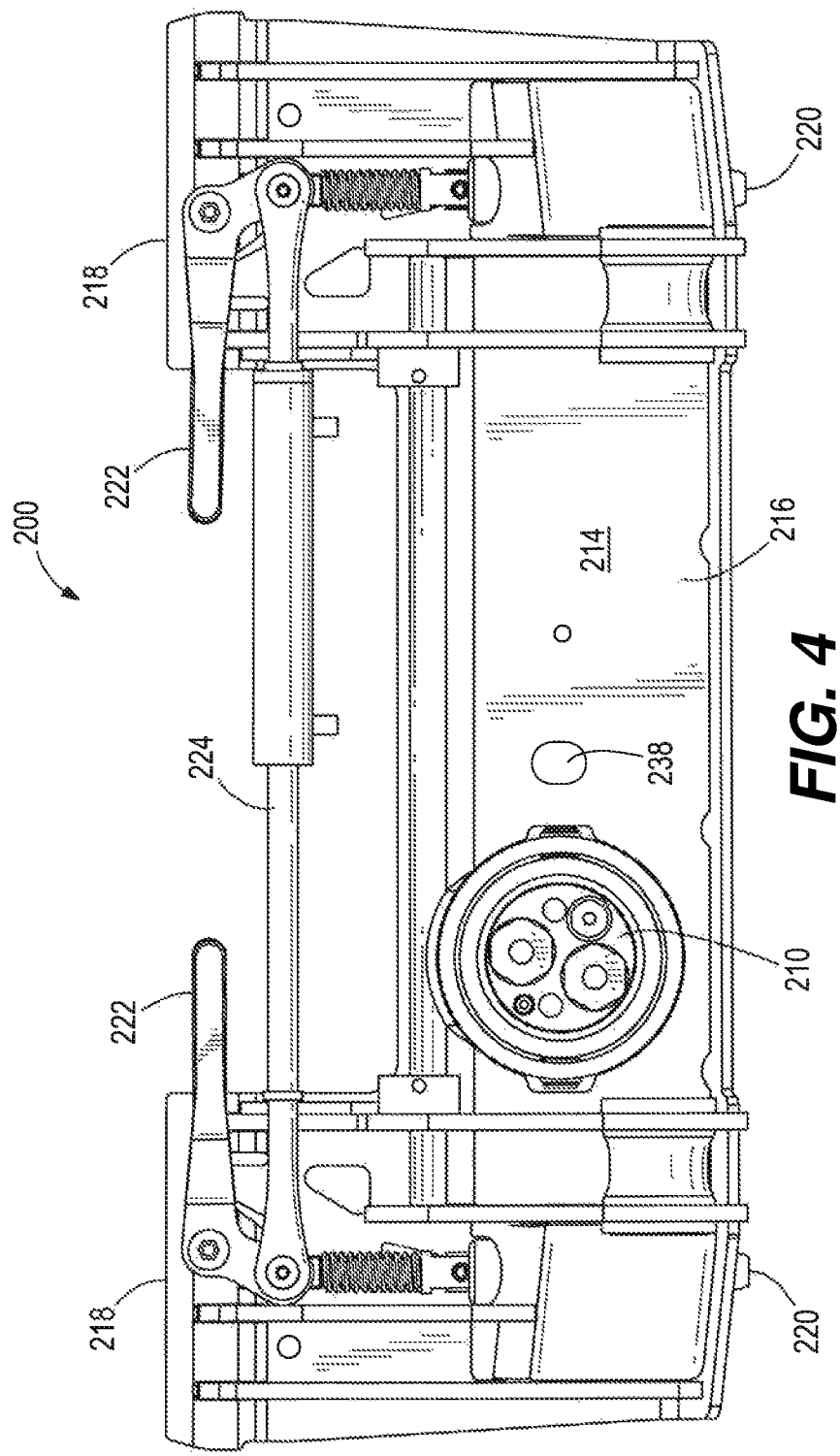
FIG. 4 is a perspective view showing a second side of the implement carrier of FIG. 3.
Figure 9:
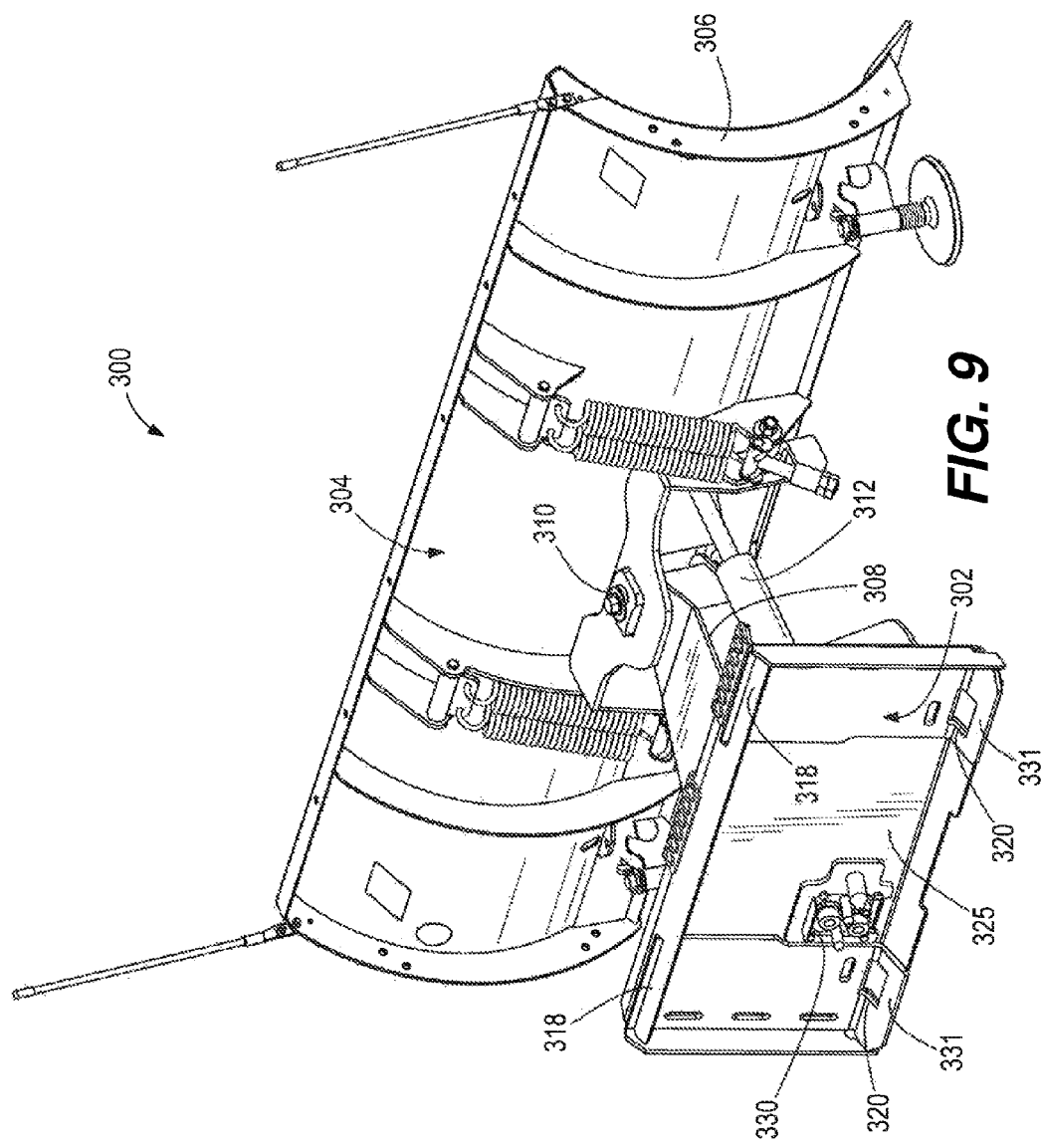
FIG. 9 is a perspective rear view of one embodiment of an implement capable of being coupled to an implement carrier of the type illustrated in FIG. 3.

One aspect of this disclosure is directed toward connection systems and methods for connecting one or more power sources on the power machine to an implement by making a connection through an implement carrier on the power machine. FIGS. 3-4 illustrate one embodiment of an implement carrier 200 that is advantageously capable of providing a connection feature that provides a source of pressurized hydraulic fluid to an implement that is coupled to the implement carrier. The implement carrier 200 is of the type that can be provided on a power machine such as power machine 100 (thereby replacing the implement carrier 130 illustrated in FIGS. 1-2). Implement carrier 200 includes a frame 202 with a first side 212 (illustrated in FIG. 3) and an opposing second side 214 (illustrated in FIG. 4). For the purposes of this discussion, the first side 212 can be referred to as a front side and the second side 214 can be referred to as a rear side. The first or front side 212 is oriented to generally face and abut an implement when the implement is attached to the implement carrier 200. When the implement carrier 200 is attached to a power machine, the second or rear side 214 is generally facing the power machine to which the implement carrier is attached, although as described above with respect to FIGS. 1-2, an implement carrier can pivot with respect to an attachment point on the a power machine so the second or rear side 214 may not always be facing the power machine. The frame 202 has one or more engagement features 218 that are capable of engaging an implement during the attachment process and one or more locking features 220 that lock the implement onto the implement carrier. In the example embodiment shown in FIGS. 3-4, the engagement features 218 are a pair of forward extending edges on a top of the frame 202 and the locking features 220 are a pair of wedges capable of being inserted into locking features on the implement on a bottom side of the frame. Referring briefly to FIGS. 3 and 9, during the process of attaching implement 300 to the implement carrier 200, the engagement features 218 of the implement carrier 200 engage with complementary engagement features 318 on an implement carrier interface 302 of implement 300. The implement 300 then pivots about an engagement axis between the engagement features 218 and the engagement features 318 on the respective implement carrier 200 and the implement 300 such that the engagement features 218 and 318 act as a sort of hinge. This pivoting occurs when the implement carrier is rotated back toward the lift arm and/or the lift arm is raised, causing the implement to be lifted so that the weight of the implement pivots the implement into position when the engagement features 218 and 318 are properly engaged. Other implement carriers can have various other types of engagement and locking features or just locking features. The frame 202 of implement carrier 200, being the type that can be used with power machine 100, has a main portion 216 that has a generally flat surface against which an interface portion of an implement can abut when connected to the implement carrier.

The locking features or wedges 220 can be manually operated by levers 222, which are rotatable to raise and lower the wedges 220. In addition, an actuator 224 is provided that can be operated to raise and lower the wedges in response to an operator input. Actuator 224 in the embodiment shown is a hydraulic cylinder and will be discussed as such in more detail below. In other embodiments, actuator 224 can be any suitable actuator, linear or otherwise, that is capable of manipulating the locking features 220 into and out of a locked position (i.e. that is capable of raising and lowering the locking wedges of this embodiment). The implement coupler 200 also includes a coupler block or assembly 210 mounted to the frame 202. The coupler block 210 houses a plurality of couplers that are configured to be connected to an implement to provide a power source. The couplers of coupler assembly 210 include a plurality of hydraulic conduits that are capable of providing pressurized hydraulic fluid to an implement that is being carried by the implement carrier 200, with the connection of the coupler block 210 to a mating connection device on an implement being made as part of the mounting of such an implement onto the implement carrier 200. In other embodiments, couplers in a coupler assembly need not be of the type that provide pressurized hydraulic fluid or be limited to couplers of the type that provide pressurized hydraulic fluid. For example, other types of couplers that might be included in such a coupler assembly would be electrical couplers. Pressurized hydraulic fluid is provided from a power source on the power machine to the actuator 224 and the coupler assembly 210 via conduits such as hydraulic hoses and/or tubelines, which are not shown in FIGS. 3-4 for clarity's sake. The implement carrier 200 also includes an alignment feature 238 in the form of an aperture is provided in the main portion 216 of the frame 202 that can assist with alignment of an implement with the implement carrier during the implement mounting process by engaging with a corresponding alignment feature on certain implements to be mounted on the implement during the implement mounting process. Some implements may not have a corresponding alignment feature and some embodiments of implement carriers likewise may not have alignment features such as alignment feature 238, but in instances where both alignment features are provided, the alignment of implement and implement carrier is improved and more particularly, the alignment of coupler block 210 and corresponding couplers on the implement is improved.

Figure 5:
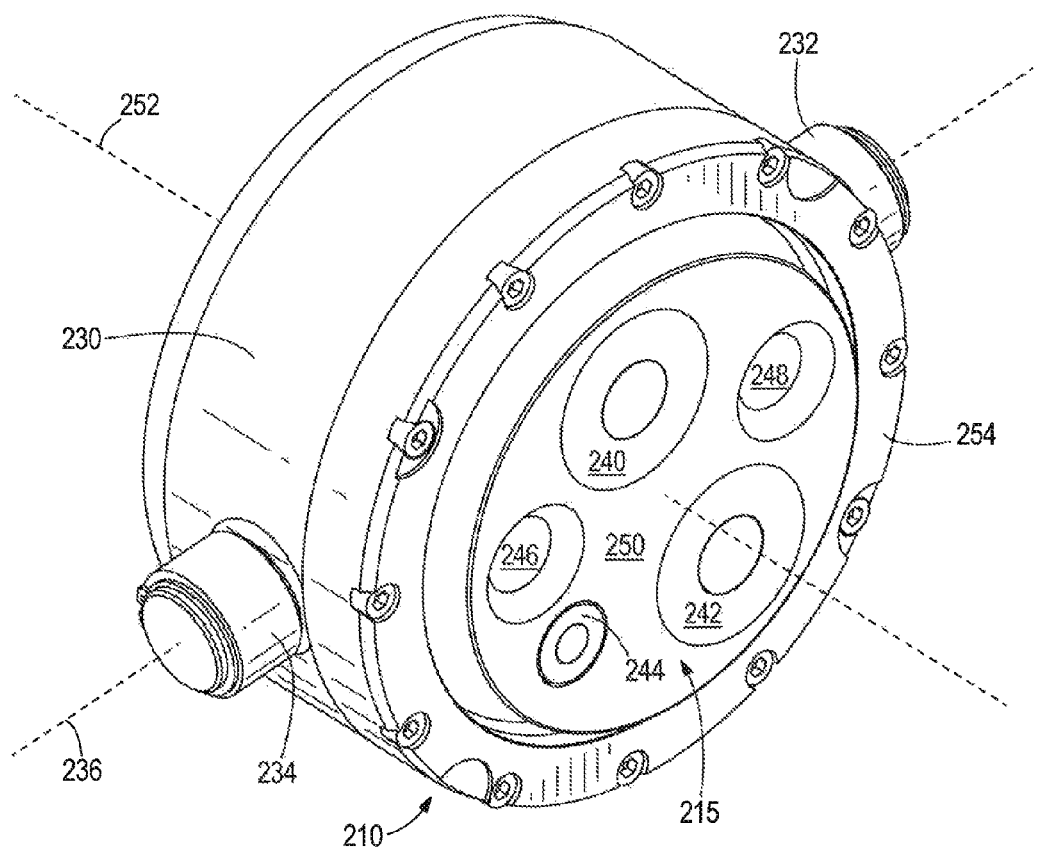
FIG. 5 is a perspective view showing a first side of the coupler block illustrated in FIG. 3.
Figure 6:
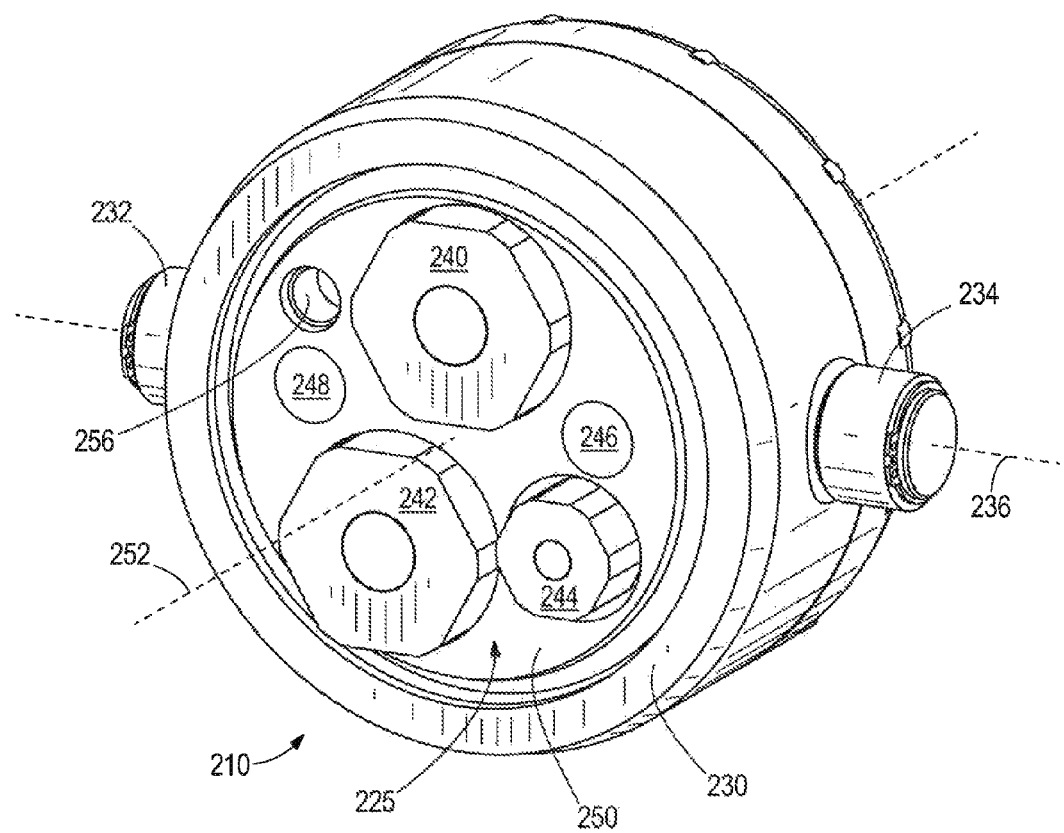
FIG. 6 is a perspective view showing a second side of the coupler block illustrated in FIG. 5.

FIGS. 5-6 illustrate the coupler block 210 shown in FIGS. 3-4 in more detail. Coupler block 210 is one embodiment of a coupler assembly that can be incorporated into implement carrier 200. Other embodiments of a coupler assembly need not include some of the features described with coupler block 210. At its most basic, an embodiment of a coupler block that can be incorporated into implement carrier 200 includes a mechanism for holding couplers for mating with couplers on an implement. The coupler block 210 of FIG. 5 shows a first side or face 215, which is capable of interfacing with couplers on an implement and FIG. 6 shows a second side 225 that opposes the first side 215. The coupler block 210 includes a housing 230 with a pair of mounting features 232 and 234 shown in this embodiment as including a pair of trunnions that are mountable to the implement carrier frame 202 to allow the coupler block 210 to pivot about an axis 236 that extends through the mounting features 232 and 234. Because the coupler block 210 is capable of pivoting with respect to the frame 202, the coupler block can be pivoted to align with couplers on an implement that is attached to the implement carrier. This pivoting feature allows the coupler block 210 to accommodate variations from one implement to the next and/or accommodate minor misalignment when making connection with a particular implement. As discussed below, because of the arcuate movement of the implement with respect to the implement carrier 200 during the connection process, there will virtually always be alignment issues for which the pivoting coupler block accommodates. Coupler block 210 is of a generally cylindrical shape, but can take on other shapes as shown in succeeding embodiments discussed below without departing from the scope of this disclosure.

The coupler block 210 has a plurality of couplers 240, 242, and 244 that are configured to mate with couplers on an implement on first ends of each of the couplers (the couplers being oriented so that the first ends of the couplers 240, 242, and 244 are positioned on the first face 215) to provide a power source in the form of pressurized hydraulic fluid to the implement. The couplers 240, 242, and 244 are capable of being coupled to conduits on a power machine on the second side 225. The couplers 240, 242, and 244 are shown generically in FIGS. 5 and 6 and can be selected from any couplers that will couple with couplers provided on implements of the type configured to be engaged with coupler block 210 to provide hydraulic fluid to the implement. One example of a type of coupler that can be employed in coupler block 210 and corresponding implements is a so-called flush face coupler. In the embodiment shown, first and second couplers 240 and 242 provide for a source and return line to and from the implement, allowing for flow of the pressurized fluid to the implement in two different directions. That is, either of the couplers 240 and 242 can be the source line with the other being the return line, depending on how hydraulic fluid is provided from the source on a power machine to which the coupler block 210 is mounted or depending on an application, each of the couplers can be either a source or return on the same power machine, that is, fluid can be provided in either of two directions, as is stated above. Coupler 244 provides a connection for so-called case drain line, which provides an additional return line from an implement. The description of the couplers 240, 242, and 244 is provided here for illustrative purposes. In various embodiments, any number of couplers can be provided in a coupler block such as the one illustrated in FIGS. 5-6 for the purposes of providing hydraulic fluid to and receiving hydraulic fluid from an implement in any configuration or direction. The specific description of the couplers shown in FIGS. 5 and 6 is not intended to limit the concepts set forth herein to that particular selection and arrangement of couplers. Various embodiments can include different types of couplers. In addition, the selected couplers can be arranged in various ways without departing from the scope of the discussion. For example, a mating pair of couplers are often referred to as including a male coupler and a female coupler. In various embodiments, a coupler block or coupler assembly can have either male or female couplers, or a combination of both. A pair of locating features 246 and 248 are formed into the first face 215. The locating features 246 and 248 are apertures capable of receiving locating protrusions on an implement. Any number and type of locating features on a coupler block can be employed.

In the embodiment shown in FIGS. 5-6, the coupler block 210 includes a piston 250 mounted within the housing 230. Other embodiments of the coupler block 210 may not have a piston of the type shown in FIGS. 5-6. The piston 250 provides a way to extend the couplers 240, 242, and 244, which are mounted in the piston 250. The piston 250 is capable of being moved relative to the housing 230 along an axis 252 from a fully retracted position, in which the piston does not extend beyond a forward edge 254 of the housing 230, to a fully extended position, in which the piston does extend beyond the forward edge 254. When the piston 250 is extended, the couplers 240, 242, and 244 are also extended as they are fixed within the piston in such a way that they move with the piston. By providing an extending member such as piston 250, the coupler block 210 is advantageously capable of providing a better engagement with an implement that is mounted to an implement carrier and is configured to be engaged with coupler block 210. Returning briefly to FIG. 3, because some implements may not be configured to engage with coupler block 210 (for example, some simple implements such as buckets do not require a source of hydraulic fluid to operate properly and other prior art implements are not configured to engage coupler block 210, but instead are configured to connect to a hydraulic source at port 134 shown in FIGS. 1 and 2, for example), having a coupler block with a piston that is capable of extending and retracting within its housing will allow the coupler block to be retracted behind the generally flat surface of the main portion 216 when such an implement is mounted on the implement carrier. In some embodiments, however, the coupler block is recessed from the flat surface of the main portion 216 such that even when the piston is fully extended, the piston is merely flush with, or even slightly recessed from the flat surface of the main portion 216. As mentioned above, other embodiments of the coupler block do not have a piston and are thus positioned flush with, or slightly recessed from the flat surface of the main portion 216. The position of the piston 250 is controlled by providing and evacuating pressurized hydraulic fluid into the housing 230. In the embodiment shown in FIGS. 5-6, a port 256 is provided that extends into the housing 230 for providing a path to allow the entry and exit of hydraulic fluid into and out of the housing 230. In other embodiments, a port can be provided in other locations (for example, through mounting feature 232 or 234) to allow pressurized hydraulic fluid to enter into and exit out of housing 230 or piston 250. In still other embodiments, a piston such as piston 250 may be extended and/or retracted with other actuation schemes and apparatuses, including, for example an electrical actuator, a spring mechanism, and pneumatic actuators, to name a few.

Figure 7:
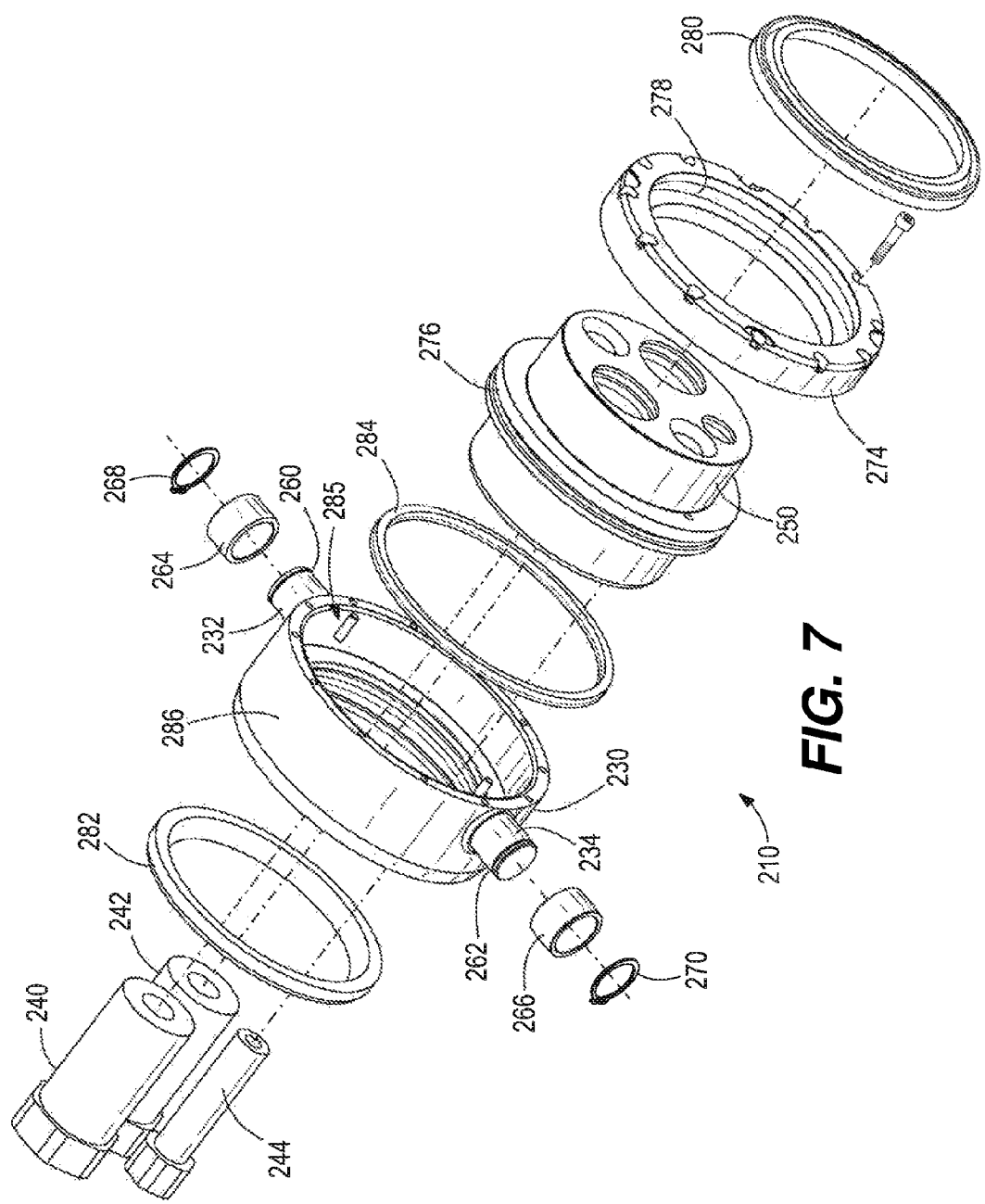
FIG. 7 is an exploded view of the coupler block illustrated in FIG. 5.

FIG. 7 illustrates an exploded view of the coupler block 210. The mounting features 232 and 234 each include a post 260 and 262, respectively, that extends laterally from the housing and a bearing or bushing 264 and 266, respectively, held on the respective posts by fasteners 268 and 270, which are shown to be in the form of snap rings. Other embodiments can have different types of mounting features, different fasteners or fastening arrangements. A fitting 272 is inserted into port 256. Fitting 272 is of the type that can be coupled to a conduit on the power machine.

Figure 7A:
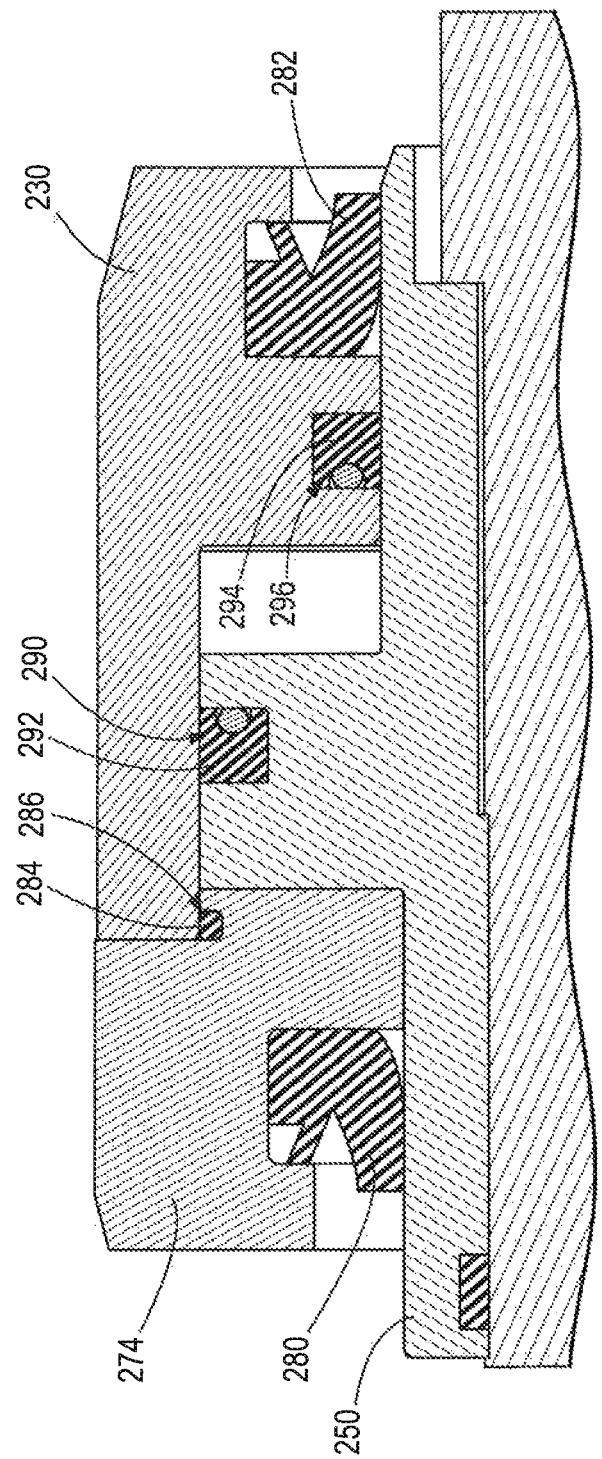
FIG. 7A is a cross-section of a portion of the coupler block of FIG. 5.

The piston 250 fits into the housing 230 and a cap 274 engages the housing 230 to hold the piston 250 therein. The cap 274 includes apertures for engaging an internal feature 285 in housing 230 to properly index the internal feature and prevent rotation of the piston 250 within the housing. In other embodiments, other anti-rotation features can be used. Seals 280 and 282 seal the piston 250 against the cap 274 and the housing 230 to prevent the intrusion of foreign material into the housing and seal 284 is inserted into a groove 286, which engages an exterior surface of the housing 230 and an interior surface of the cap 274. FIG. 7A illustrates a cross-sectional view of a portion of the coupler block 210. Seal 284 is shown seated into groove 286 and seals 280 and 282 are shown positioned between the piston 250 and the cap 274 and housing 230, respectively. Seals 280 and 282 are deformed to fit and seal against the piston 250, with their non-deformed or free shape shown in outline against piston 250 in FIG. 7A. Seal 290 is positioned in a groove 292 in the piston 250 and seal 294 is positioned in a groove 296 in the housing 230 to seal the pressurized hydraulic fluid that is provided via port 256 into housing 230 to urge the piston 250 out of the housing (i.e. the housing with the cap 274 attached thereto as shown in FIG. 7A. The piston 250 is, in one embodiment, not biased into any one position but can be retracted when a force is applied to the piston on the first surface 215 of the coupler block 210, even if hydraulic fluid is being provided into the housing 230, provided the force applied to the first surface 215 is greater than the force applied by the hydraulic fluid provided into the housing 230 for the purposes of urging the piston 250 out of the housing.

Figure 7B:
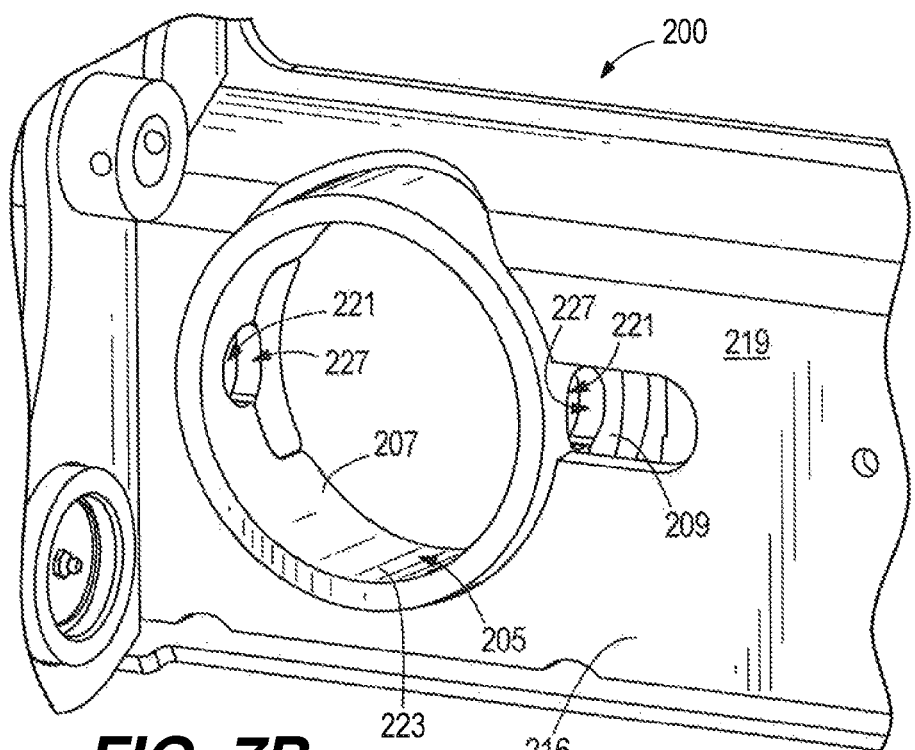
FIG. 7B illustrates an enlarged view of the implement carrier of FIG. 3 illustrating a coupler block carrier for carrying the coupler block of FIG. 5 according to one illustrative embodiment.
Figure 7C:
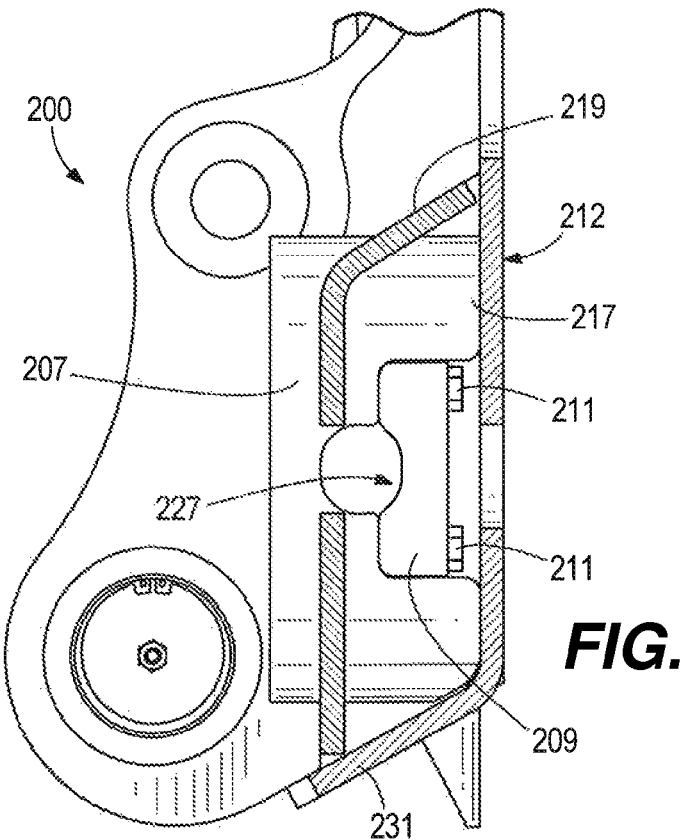
FIG. 7C is a cross-sectional view of the coupler block carrier of FIG. 7B.

As discussed above, the coupler block 210 is pivotally mounted into the implement carrier 200. FIGS. 7B and 7C illustrate a portion of implement carrier 200 showing a carrier 205 to which the coupler block 210 is pivotally mounted. The carrier 205 includes a fixed portion or ring 207 that is secured to the main portion 216 of the implement carrier 200. In the embodiment shown, the main portion 216 includes a front plate 217 that forms some or all of the front side 212 of the implement carrier 200. An angled back plate 219 is secured to the front plate 217 such as by welding and the ring 207 of the carrier 205 is secured to the angled back plate 219 such as by welding. The ring 207 can also be fixed to the front plate 217 by welding. The front plate also includes an angled engagement surface 231, which is configured to engage a complementary surface on an implement to apply a retaining force on the implement when the implement is secured to the implement carrier 200. The ring 207 has a pair of notches 221 formed into an outside wall 223, the notches being sized to accept a portion of the mounting features 232 and 234 (shown in FIG. 5) of the coupler block 210. During assembly, the coupler block 210 is placed into position adjacent the fixed portion 207 of the carrier 205 and is pivotally secured by the fixed portion and a removable cover portion 209 of the carrier. The removable cover portion 209 of the carrier 205 is secured to the fixed portion 207 with fasteners 211. The removable cover portion has notches 227 that are aligned with notches 221 to engage and hold the coupler block in place. Different embodiments can have a coupler block carrier with different features from those of carrier 205. For example, other carriers can have a removable cover that is made of a single piece as opposed to the plurality of pieces shown in FIG. 7B. As another example, the coupler block can be inserted into a carrier and the entire carrier can be affixed with fasteners to the implement carrier, rather than having a fixed portion that is welded to the implement carrier.

Figure 8:
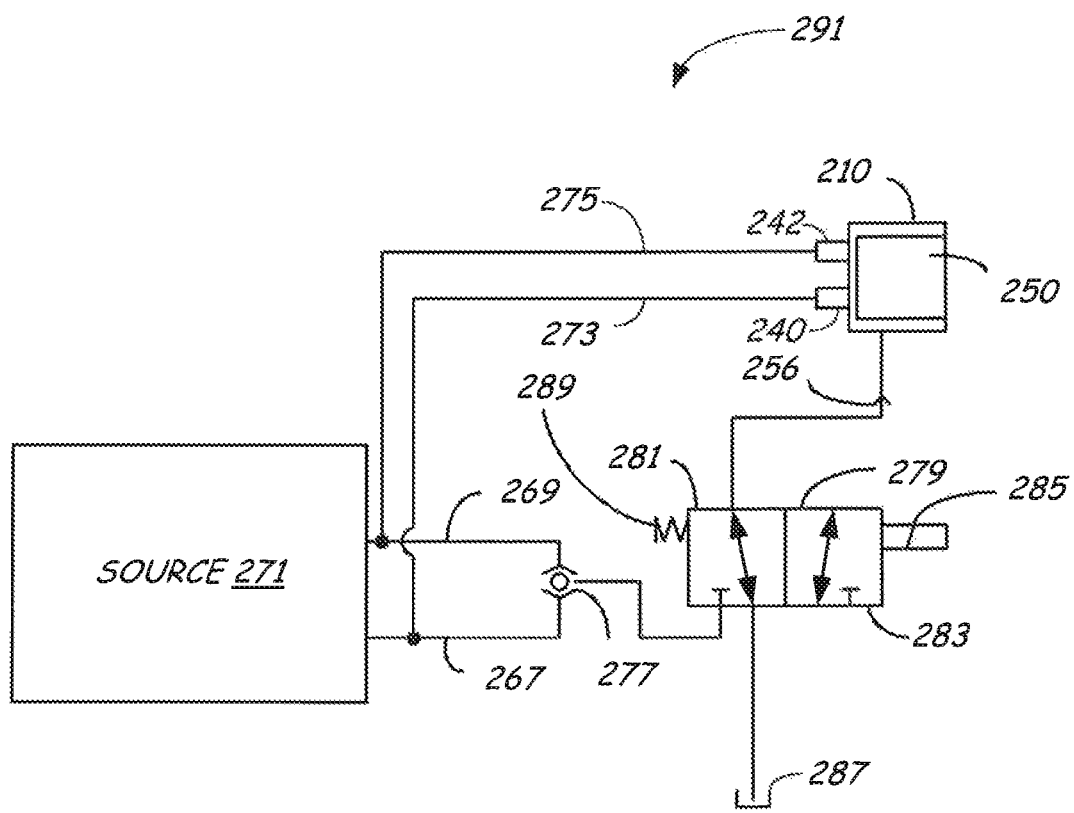
FIG. 8 is a schematic representation of a portion of a hydraulic circuit of a power machine having an implement carrier having a coupler block as shown in FIG. 3 according to one embodiment.

FIG. 8 schematically illustrates a portion of a hydraulic circuit 291 for use in a power machine such as power machine 100 for providing pressurized hydraulic fluid to coupler block 210 on implement carrier 200. The hydraulic circuit 291 includes a source 271 of pressurized hydraulic fluid that is capable of being selectively supplied via a first output 267 or a second output 269 such that when pressurized hydraulic fluid is provided via one of the first output and the second output, the source is capable of receiving returned fluid via the other of the first output and the second output. The source 271 can include a bi-directional pump that is controlled to selectively provide pressurized hydraulic fluid or alternatively, a pump that provides pressurized hydraulic fluid to a control valve, which in turn selectively provides hydraulic fluid in response to operator input to either one of the first and second outputs 267 and 269. A path is provided from the first output 267 via a conduit 273 to the coupler 240 and a path is provided from the second output 269 via a conduit 275 to coupler 242. In addition, the first and second outputs 267 and 269 are in fluid communication with a shuttle valve 277 as inputs thereto.

An output of the shuttle valve 277 is provided as an input to a coupler block control valve 279, which is capable of selectively providing pressurized hydraulic fluid to and evacuating pressurized hydraulic fluid from coupler block 210. Coupler block control valve 279 as shown in FIG. 8 is a two-position valve with a first position 281 providing a path from coupler block 210 to a low pressure reservoir 287. The coupler block control valve 279 is biased to the first position 281 in this embodiment, although in other embodiments that need not be the case. When the coupler block control valve 279 is in a second position 283, the output of the shuttle valve 277 is in communication with coupler block 210 and more specifically with port 256 of coupler block 210. When coupler block control valve 279 is in the second position 283 and the source 271 is providing pressurized hydraulic fluid to one of the first and second outputs 267 and 269, the pressurized hydraulic fluid is also provided via the second position 283 to port 256 of control block 210, thereby urging piston 250 out of the housing. When the source 271 is not providing pressurized hydraulic fluid to one of the first and second outputs 267 and 269 and the coupler block control valve 279 is in the second position 283, any pressure that may have been provided to port 256 when the shuttle valve 277 is closed will be present to piston 250.

An actuator 285 is provided to control the position of the valve 279. Actuator 285, when actuated, overcomes a biasing member 289 to move the valve from the first position 281 to the second position 283. Actuator 285 is an electrically actuated solenoid, although any suitable actuator can be used. Actuator 285 is actuated in response to operator input. In one embodiment, the actuator 285 is actuated in response to actuation of an operator input that initiates an auxiliary hydraulics mode, that is, a mode that allows for providing hydraulic fluid to an implement that is operably coupled to the power machine. In other embodiments, actuator 285 can be actuated in response to other operator inputs.

Figure 8A:
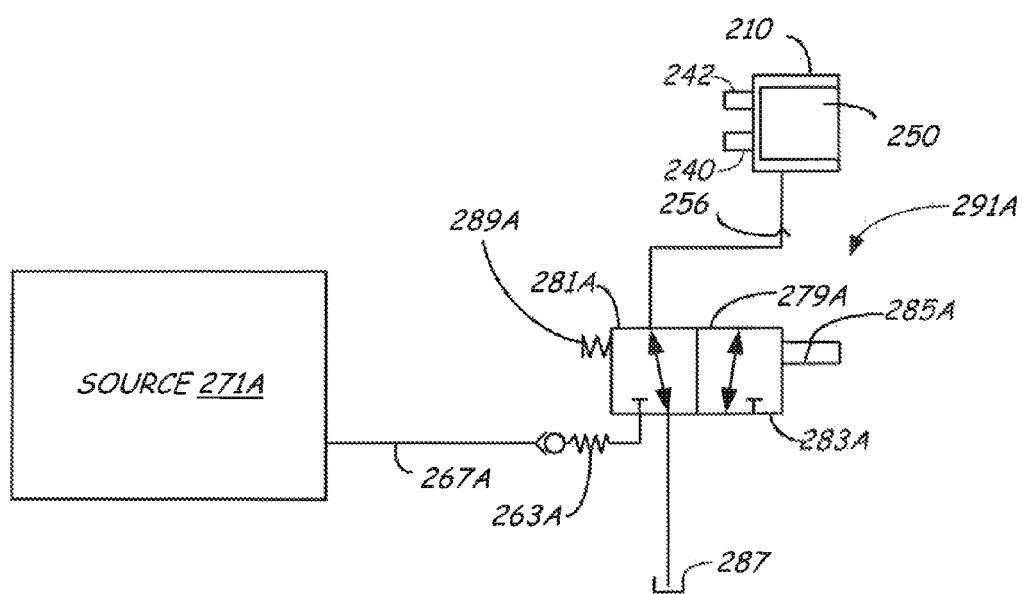
FIG. 8A is a schematic representation of a portion of hydraulic circuit of a power machine having an implement carrier having a coupler block as shown in FIG. 3 according to another embodiment.

FIG. 8A illustrates schematically illustrates an alternative embodiment of a portion of a hydraulic circuit 291A form providing pressurized hydraulic fluid to coupler block 210 on implement carrier 200. A power source 271A provides a source of pressurized hydraulic fluid via an output 267A, which is provided to a coupler block control valve 279A. The power source 271A is, in one embodiment, a constant volume pump that provides fluid in a single direction, thereby eliminating the need for a shuttle valve of the type shown in FIG. 8 to select an input to the coupler block control valve 279A. A check valve 263A is provided between the source 271A and the coupler block control valve 279A. The coupler block control valve 279A is similar to the coupler block control valve 279 and is used to selectively provide and evacuate fluid to block 210 for controlling the introduction and evacuation of pressurized fluid be to piston 230. Coupler block control valve 279A has a first position 281A that provides a path from coupler block 210 to a low pressure reservoir 287. The coupler block control valve 279A is biased to the first position 281 via biasing member 289A. When the coupler block control valve 279A is in a second position 283A, the output 267A of the source 271A is in communication with coupler block 210 and more specifically with port 256 of coupler block 210, thereby urging piston 250 out of the housing.

Actuator 285A is provided to control the position of the valve 279A. Actuator 285A, when actuated, overcomes biasing member 289A to move the valve from the first position 281A to the second position 283A. Actuator 285A is an electrically actuated solenoid, although any suitable actuator can be used. Actuator 285A is actuated in response to operator input. In one embodiment, the actuator 285A is actuated in response to actuation of an operator input that initiates an auxiliary hydraulics mode, that is, a mode that allows for providing hydraulic fluid to an implement that is operably coupled to the power machine. In other embodiments, actuator 285 can be actuated in response to other operator inputs.

FIG. 9 illustrates an implement 300 of the type that is configured to be mounted onto implement carrier 200 and more particularly is configured to be coupled with coupler block 210 according to one illustrative embodiment. Implements of this type, including implement 300 include an implement carrier interface 302 and a tool portion 304. The implement carrier 302 interface includes complementary engagement features 318 and locking features 320 that are configured to engage the engagement features 218 and 220 (shown in FIG. 3) on implement carrier 200 to secure the implement 300 to the implement carrier and a complementary angled engagement surface 331 that is configured to engage the angled engagement surface 231 when the implement 300 is coupled to the implement carrier 200. The complementary engagement features 218 and 318 and 231 and 331 and the locking features 220 and 320 ensure that implement 300 is secured to an implement carrier such as implement carrier 200 in substantially the same position. During the attachment process, the implement 300 pivots about the axis of engagement of complementary features 218 and 318 so that the implement 300 travels along an arcuate path about the axis of engagement to attach the implement to the implement carrier. Because various power machines have an implement carrier substantially similar to implement carrier 200 and various implements have implement interfaces that are substantially similar to implement interfaces 302, a single implement can be secured to a variety of different power machines and a variety of different implements (including a variety of different types of implements) can be attached to a single power machine. However, manufacturing variances and component wear over time can result in a less than identical lineup between a given implement carrier and a given implement interface. Because it is important to have precise alignment of the coupler block 210 and couplers on the implement, alignment features are provided as are discussed above and in more detail below.

The tool portion 304 includes a blade 306 that is mounted to a frame 308 at a pivotal mount 310. An actuator in the form of a hydraulic cylinder 312 is provided to pivot the blade 306 in response to operator inputs that are actuated to cause a power machine to which the implement is attached to provide pressurized hydraulic fluid to the implement (via a coupler block 210 as shown above). Different implements will have different tool portions and the implement 300 shown is for illustrative purposes only, with the understanding that many other types of tools can incorporate the concepts related to coupling of a power source through an implement carrier to an implement.

Figure 10:
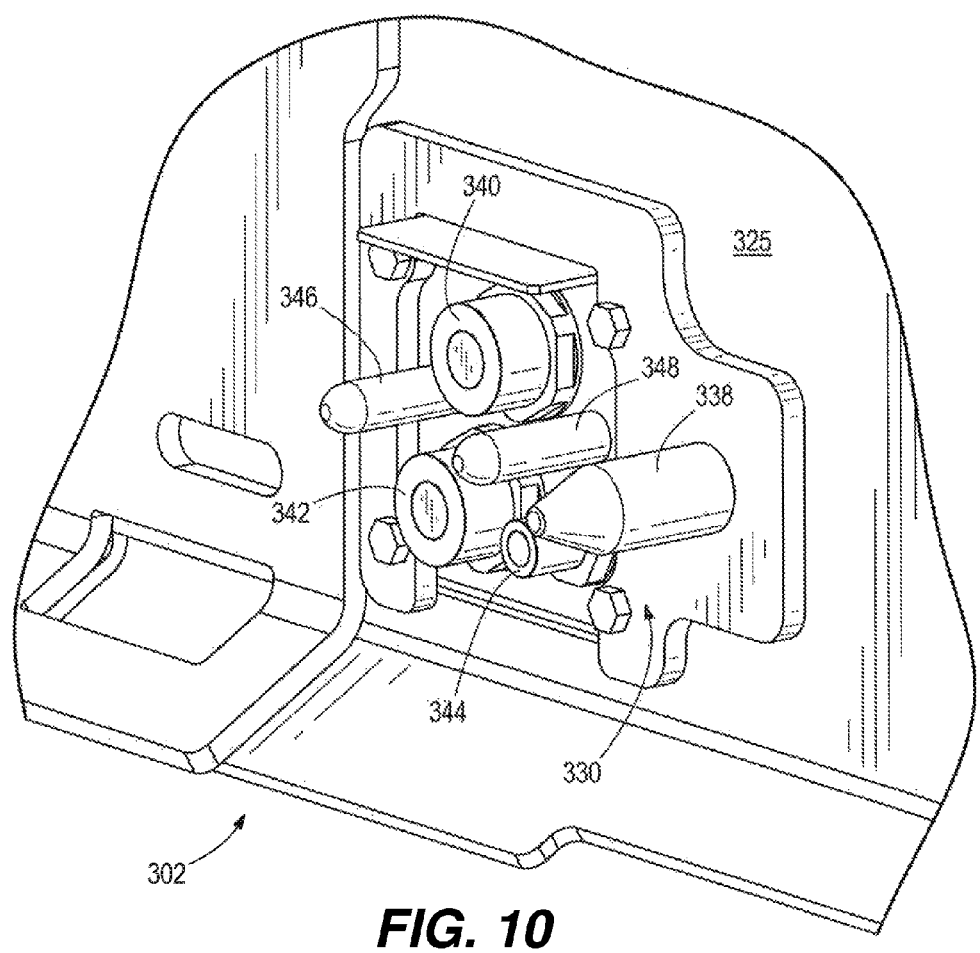
FIG. 10 is an enlarged view of an implement carrier interface from the implement of FIG. 9, showing a coupler assembly in more detail.

FIG. 10 shows an enlarged view of implement carrier interface 302. Implement interface includes a generally flat surface 325 with a coupler assembly 330 that is configured to engage coupler block 210. Coupler assembly 330 includes couplers 340, 342, and 344, each of which is configured to engage with couplers 240, 242, and 244, respectively. A pair of locating features 346 and 348 are provided that are configured to engage with locating features 246 and 248. In addition, a locating feature 338 is capable of engaging locating feature 238 in the main portion 216 of the implement carrier 200.

Figure 11:
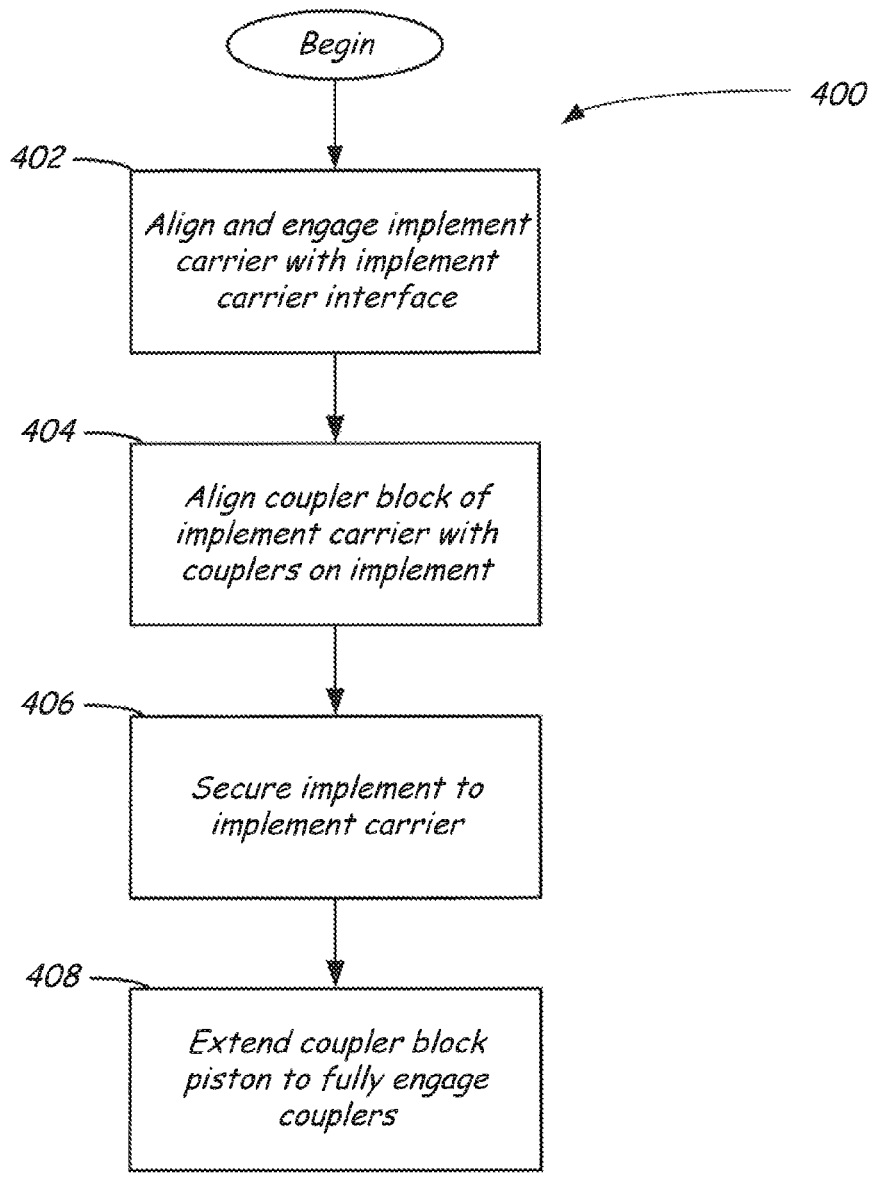
FIG. 11 is a flowchart illustrating a method of coupling an implement having a coupler assembly of FIG. 10 to a power machine having an implement carrier of FIG. 3 according to one illustrative embodiment.

FIG. 11 illustrates a method 400 of securing an implement having an implement carrier interface such as implement carrier interface 302 described above to an implement carrier 200 according to one illustrative embodiment. The method 400 is described with reference to features of the implement carrier 200 and the implement carrier interface 302 illustrated in FIGS. 3-10 and discussed above. At block 402 of the method, a power machine having an implement carrier 200 is aligned and engaged with an implement carrier interface 302. Aligning and engaging the implement carrier 200 can include rotating the implement carrier about pivoting joint 132 so that engagement features 218 are aligned with engagement features 318 and positioning locking features 220 in an unlocked position. These particular details are relevant to the implement carrier described above. Implement carriers having other types of engagement and/or locking features can require that other steps be taken to align and engage an implement carrier with an implement carrier interface. In addition, implement carrier 200 is capable of securing implements that do not have couplers capable of interfacing with coupler block 210. The method 400 is directed specifically at securing an implement such as implement 300 that does have such couplers to the implement carrier 200.

At block 404, the method further includes aligning coupler block 210 on the implement carrier 200 with couplers on the implement. This alignment may occur simultaneously with the engagement of the implement carrier with the implement carrier interface. However, because the implement 300 is rotating about the axis of engagement formed by the engagement of the engagement features on each of the implement carrier 200 and the implement, during the alignment process, the couplers on the implement are not in alignment with the coupler block 210. That is, if the coupler block 210 is oriented such that the front face 215 is parallel with first side or face 212, the couplers on the implement 300 will not be aligned with the couplers in the coupler block (i.e. the couplers on the implement will not be positioned along the axis 252. As described above, the coupler block 210 is capable of rotating on its mounting features 232 and 234 to accommodate the lack of linear alignment because of the arcuate travel path of the implement. The alignment is thus a sort of clamshell alignment process, with the coupler block 210 pivoting to align with the implement couplers (i.e. rotating so that axis 252 is in alignment with the couplers on the implement 300) as the implement 300 approaches the implement carrier. Advantageously, the weight of the implement 300 itself facilitates the alignment and urges the engagement of the coupler block 210 with the couplers on the implement 300. Thus, the implement coupler block 210 and the couplers on the implement can be aligned and engaged without the use of any additional actuators to make the connection. While the embodiments above disclose a pivoting coupler block 210 and rigid or stationary couplers on the implement, in alternate embodiments, the arrangement of the coupler block and rigidly mounted couplers can be reversed, with a pivoting coupler block being mounted to the implement and with rigidly mounted couplers being mounted on the implement carrier.

Alignment of the coupler block 210 and the couplers on the implement 300 includes engagement of the locating feature 338 on the implement carrier interface 302 with the locating feature 238 on the implement carrier 200 and engagement of the locating features 346 and 348 with the locating features 246 and 248. In the embodiments shown above, the locating features 338, 346, and 348 are protruding pins that engage locating features 238, 246, and 248, which are apertures. Because, as is described above, the implement carrier 200 is configured to be secured not only to implements that are configured to engage with coupler block 210, but also with implements that are not configured to engage with coupler block 210, it is advantageous that locating features 238, 246, and 248 are such that they do not extend beyond the first face 215. The locating feature 338, in one embodiment, is longer than the locating features 346 and 348. Thus, locating feature 338 engages with the locating feature 238 before the locating features 346 and 348 engage with locating features 246 and 248. The interaction of locating features 238 and 338 provides a relatively rough alignment and will facilitate the location of coupler 210 with respect to coupler 330, with the subsequent interaction of the locating features 246 and 248 with locating features 346 and 348 providing a final alignment. When all of the locating features are engaged, the couplers 240, 242, and 244 are aligned with the couplers 340, 342, and 344.

At block 406, the implement 300 is secured to the implement carrier 200. This is accomplished by engaging the locking features or wedges 220 on the implement carrier 200 with the locking features 320 on the implement 300. When the implement 300 is secured to the implement carrier 200, the implement carrier 200 applies a holding force against the engagement features 318 and the complementary angled engagement surface 331 to hold the implement 300 on the implement carrier, with the wedges 220 engaging the locking features 320 to ensure that the implement 300 remains in place. When the implement 300 is secured to the implement carrier 200, the couplers 240, 242, and 244 in the coupler block 210 are aligned with the couplers 340, 342, and 344 and in the process of securing the implement carrier 200, these aligned couplers are coupled together. Because the couplers are coupled together as part of securing the implement to the implement carrier, on power machines that employ an actuator such as actuator 224 to secure the implement to the implement carrier, an operator will be able to secure the implement to the implement carrier and simultaneously couple the couplers, all without leaving the operator compartment. However, due to variations in manufacturing from one implement to another or one implement carrier to another or in wear over time during operation, the couplers 240, 242 and 244 may not extend far enough to be fully coupled to the couplers 340, 342, and 344. Thus, at block 408, the method provides for extending the piston 250 forward toward the couplers 340, 342, and 344, thereby advantageously providing a structure and method for providing alignment in a fore and aft direction relative to coupler block 210. Extension of the piston 250 is accomplished in response to an operator input. This input can be the same input used to signal an intention to cause actuator 224 to engage the locking features or wedges 220 with locking features 320 or a separate input device can be provided to receive a signal to extend the piston 250. In embodiments where a piston such as piston 250 is not provided in the coupler block, an attachment method would not include this step.

Figure 12:
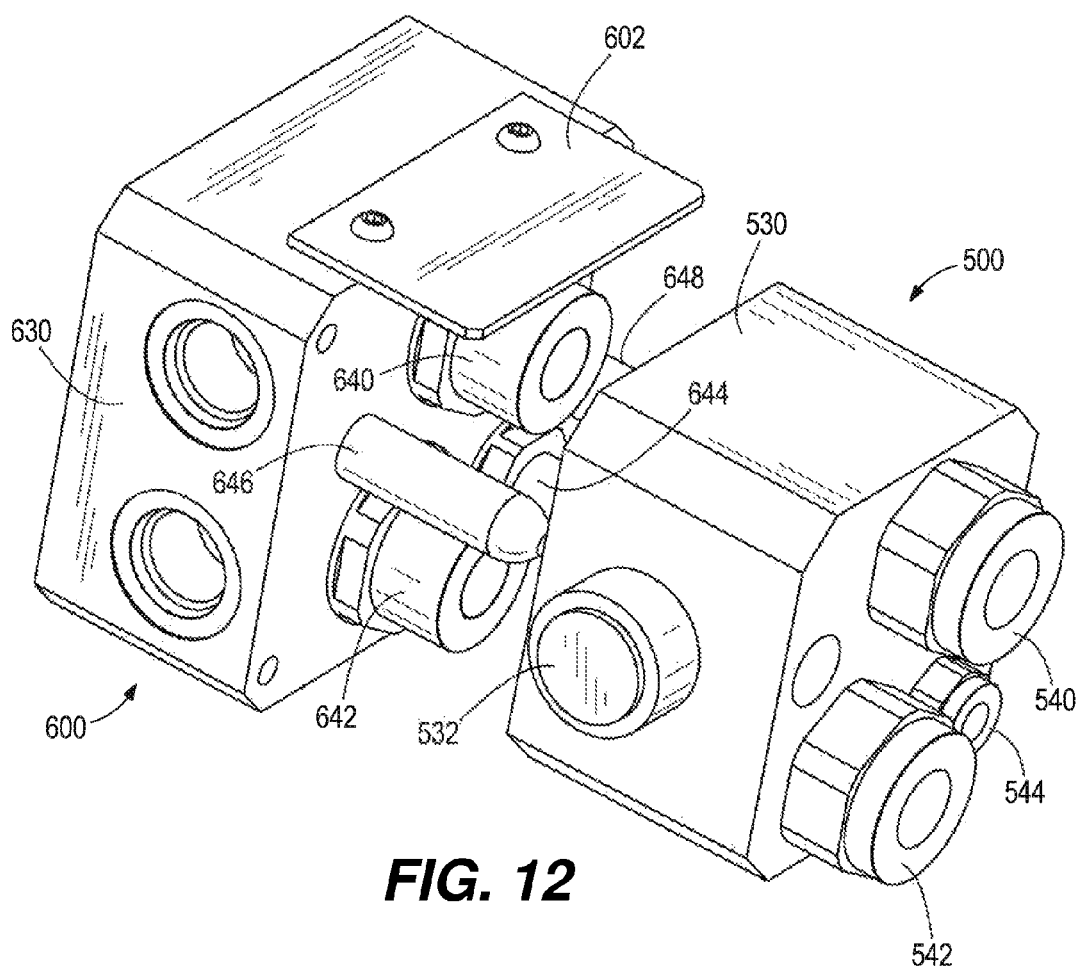
FIG. 12 illustrates a coupler block for an implement carrier of a power machine and coupler assembly for an implement that are configured to engage and be secured to one another according to another illustrative embodiment.

Implements such as implement 300 that have hydraulic actuators, such as cylinders, motors, and the like that receive pressurized hydraulic fluid from a power machine typically have couplers for connection to the power machine that prevent hydraulic fluid from escaping from hydraulic lines on the implement when the implement is not connected to a power machine. The couplers thus operate as check valves that block flow out of the implement when the implement is not coupled to a power machine. While this advantageously prevents hydraulic fluid from leaking out of the implement, when an implement is disconnected, residual pressure (or pressure buildup, for example as the result of temperature changes between the time when an implement is disconnected and reconnected) in the implement can make connection to a power machine difficult, because enough force has to be applied to the couplers to overcome the pressure in the hydraulic conduits on the implement. FIG. 12 illustrates another embodiment of a coupler assembly 600 for use on an implement such as implement 300 to house couplers and that provide additional features for pressure relief when the implement is not coupled to a power machine. Coupler assembly 600 is shown in FIG. 12 positioned adjacent to a coupler block 500. Coupler block 500 illustrates another embodiment of a coupler block of the type that can be integrated into an implement carrier such as implement carrier 200. Coupler block 500 is shaped somewhat differently than coupler block 210 described above, and thus would require a differently shaped carrier than carrier 205. In addition, coupler block 500 does not include the piston arrangement (i.e. piston 250) of coupler block 210. Thus, the piston 250 and its functions are not necessarily included in every embodiment, as shown here, although coupler blocks with a piston arrangement similar to piston 250 can be used to engage the coupler assembly 600 without departing from the scope of the disclosure. Coupler block 500 does include a housing 530, couplers 540, 542, and 544 as well as a pair of trunnion mounting features (only one of which, 532, is shown in FIG. 12). The couplers 540 and 544 shown in cross-section in FIGS. 13-17 are shown to each have a stem (550 and 551, respectively). Any couplers capable of interfacing with couplers 640, 642, and 644 can be used in coupler block 500 and such couplers will necessarily have internal features not shown in any of FIGS. 13-17. For example, stems 550 and 551 necessarily will include features to position them within their respective couplers and/or provide a biasing force as necessary.

Coupler assembly 600 includes a housing 630, with couplers 640, 642, and 644 mounted therein. Coupler assembly 600 is configured to be rigidly mounted on an implement interface such as implement interface 302 so that the couplers in the coupler assembly can be positioned and sized to engage with couplers 540, 542, and 544 on coupler block 500. Locating features 646 and 648 are likewise sized and positioned to engage with locating features on coupler block 500 (not shown in FIG. 12). In alternate embodiments, coupler assembly 600 can be pivotally mounted to an implement interface. A debris shield 602 is attached to the housing 630 to deflect material that might fall between the coupler assembly 600 and the coupler block 500 when they are mated.

Figure 13:
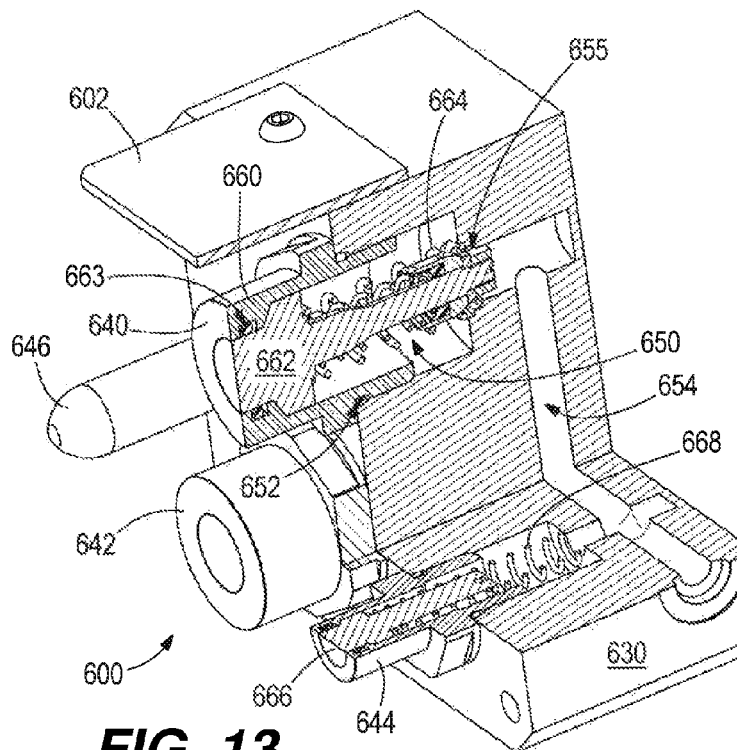
FIG. 13 is a cross-sectional perspective view of the coupler assembly of FIG. 12, taken across two of the hydraulic couplers.

FIG. 13 illustrates a cross section of coupler assembly 600 taken across couplers 640 and 644. Coupler 642 is substantially similar to coupler 640 and is not shown in cross-section for simplicity's sake. Coupler 640 is inserted into a cavity 650 in coupler assembly 600 and fixed in the cavity such as by a threaded engagement. As shown in FIG. 13, a groove 652 is formed into the coupler 640 for carrying a seal (not shown) to seal the coupler 640 in the coupler assembly 600. Coupler 640 is configured to engage with a mating coupler (such as coupler 540 in coupler block 500) to provide a fluid flow path between a power machine and hydraulic components on an implement. The coupler assembly 600 includes a port 656 (shown in FIG. 14) that provides a communication path from the cavity 650 with a hydraulic circuit on the implement. In addition, coupler assembly 600 has a fluid relief path 654 that is selectively in communication with cavity 650. The fluid relief path 654, as discussed in more detail below, provides additional volume to hold pressurized fluid when the implement is not connected to a power machine, thereby reducing the pressure of fluid in the implement when the implement is not attached to a power machine.

Coupler 640 includes a body 660 and a valve member 662, which is movable between a closed position as shown in FIG. 13 and an open position. A seal (not shown) is positioned with in a groove 663 in the body 660 to seal the valve member 662 against the body. In the closed position, hydraulic fluid is generally unable to enter or exit the coupler assembly 600 through coupler 640. A biasing member 664 biases the valve member 662 to the closed position. When the valve member 662 is in the open position, hydraulic fluid is capable of entering or exiting the coupler assembly 600 through coupler 640. Coupler 644 likewise has a valve member 666 and a biasing member 668. Valve member 666 is also shown in a closed position in FIG. 13, with biasing member 668 urging the valve member 666 into the closed position.

Figure 14:
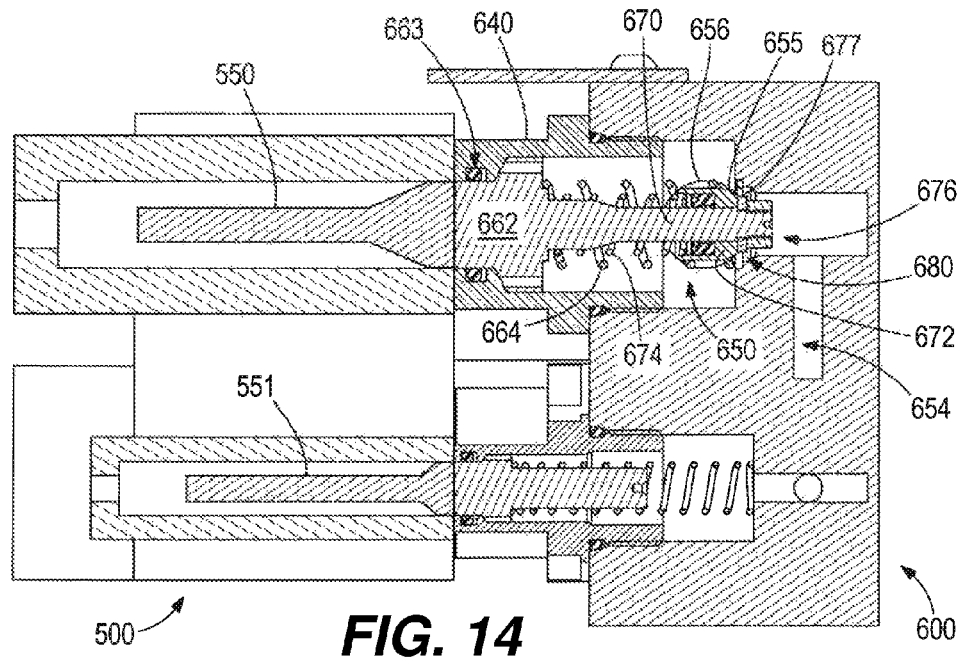
FIG. 14 is a cross-sectional view of the coupler block of FIG. 12 aligned with the coupler assembly of FIG. 12, the cross-section taken across two of the couplers.

FIG. 14 illustrates a cross-section of coupler assembly 600 along with a cross section of coupler block 500 positioned adjacent and aligned with coupler assembly 600, but not yet engaged with coupler assembly 600. FIG. 14 provides a better view of fluid relief path 654 and the engagement between the fluid relief path and cavity 650. Fluid relief path 654 includes an opening 655 into which a plunger portion 670 of the valve member 662 enters when the valve member 662 moves from the closed position to the open position. A sealing member 672 is fitted over the plunger 670 and is shaped to engage and seal the opening 655 when the valve member 662 moves toward the open position. A biasing member 674 urges the sealing member 672 toward an end 676 of the plunger 670 and is retained by a fastener 677 such as a snap ring or other suitable retainer. When the valve member 662 is in the closed position as shown in FIG. 14, a gap 680 exists between the sealing member 672 and the opening 655, thereby allowing pressurized hydraulic fluid to travel between the cavity 650 and the fluid relief path 654.

Figure 15:
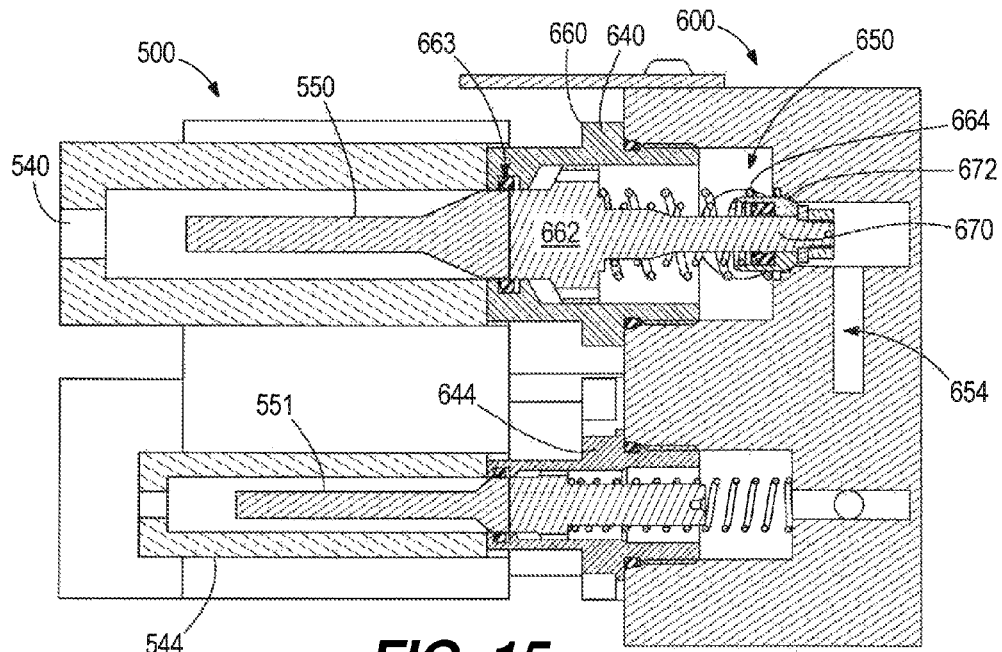
FIGS. 15-17 illustrate the coupler block and coupler assembly of FIG. 14 in various states of engagement.
Figure 16:
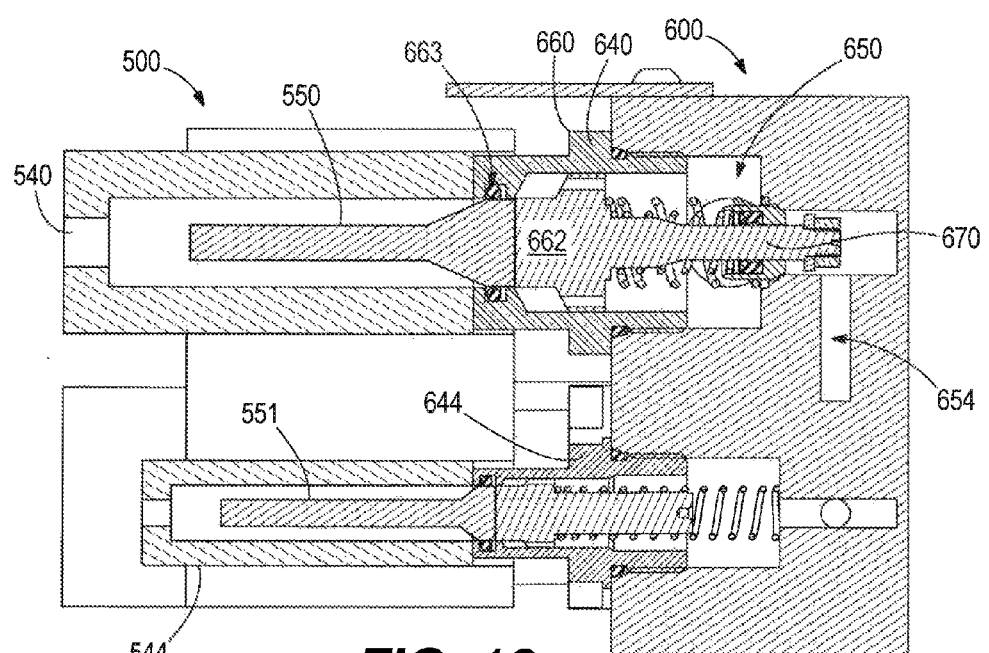
Figure 17:
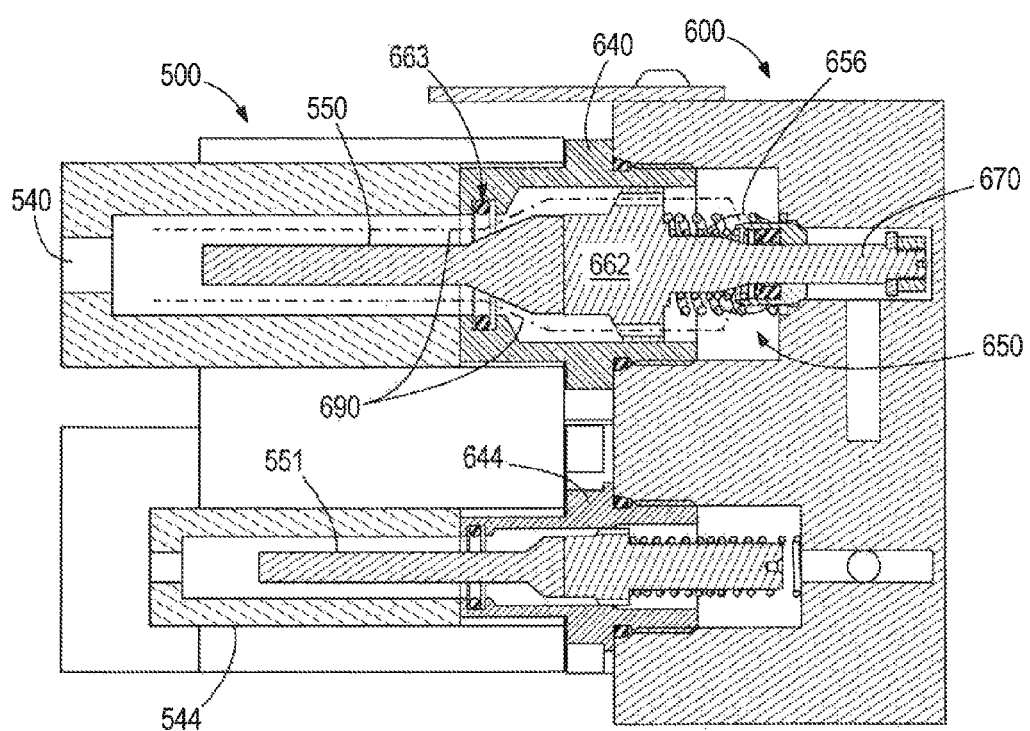

FIGS. 15-17 illustrate the coupler assembly 600 aligned with coupler block 500, showing varying degrees of engagement between the couplers 640 and 644 and couplers 540 and 544 of coupler block 500. Coupler 642 also engages coupler 542 in a manner similar to that of the engagement between coupler 640 and 540, but is not described here for simplicity's sake. Couplers 540 and 544 of coupler block 500 are representative examples of so-called flush face couplers and any coupler that is capable of mating with couplers 640 and 644 can be employed. The internal features of couplers 540 and 544 are shown for clarity's sake during the engagement process. However, these internal features are not germane to the embodiments discussed herein. In FIG. 15, the couplers 640 and 644 are in the beginning stages of engagement with couplers 540 and 544. Body 660 has partially entered the coupler 540 and valve member 662 has been engaged by an internal feature 550 (a stem as shown in the figures, but any internal feature than can engage valve member 662 can be employed) of coupler 540 that acts against the valve member 662 to overcome the biasing member 664 and cause the plunger 670 to enter the fluid relief path 654. As shown in FIG. 15, the valve member 662 has not moved into the body 660 far enough so that it is no longer sealed against the body (i.e. the seal in groove 663 would still be in engagement with the valve member). In this position, the plunger 670 with sealing member 672 has sealed off the fluid relief path 654 from the cavity 650 before pressurized hydraulic fluid can enter or exit the cavity 650 via coupler 540.

In FIG. 16, the couplers 640 and 540 (as well as couplers 644 and 544) are further engaged so that a small amount of pressurized hydraulic fluid can move into and out of cavity 650 via coupler 540. The valve member 662 has moved far enough into the body 660 that the seal in groove 663 is no longer in engagement with the valve member. Pressurized hydraulic fluid can pass between the coupler 540 and the cavity 650 at a relatively slow rate. In FIG. 17, the couplers 540 and 640 are fully engaged, and a path 690 is provided between the coupler 540, the cavity 650, and the port 656. By fully engaged, it is meant that the couplers are engaged to allow adequate flow of pressurized hydraulic fluid as needed by actuators on the implement. The discussion above is primarily related to couplers 540 and 640, but couplers 542 and 642 are similarly configured.

The examples discussed above illustrate the connection of hydraulic lines between an implement and a power machine to provide pressurized hydraulic communication between the implement and power machine. Some hydraulic implements also or alternatively have electrical communications there between. In some embodiments, electrical communication can be made by manually connecting electrical connectors at a port on the power machine such as at port 134 illustrated on power machine 100 above. In other embodiments, electrical connectors can be included in block 210 or 500 for connection to electrical connectors that are including in the coupler assembly 330 or 600. Alternatively still, a second coupler block on the implement carrier and a second coupler assembly on the implement carrier interface can be provided for to make electrical communication between the power machine and implement.

The arrangement of the coupler blocks 210 or 500 on implement carrier 200 allows for mounting implements that are not equipped with coupler assemblies that can engage such a coupler block onto the implement carrier. One example of such an implement would be a simple bucket, which does not have any sort of hydraulic function. Another example of such an implement would be an implement that has hydraulic functions requiring hydraulic power from a power machine but does not have a coupler block such as 330 or 600. In one embodiment of a power machine with an implement coupler such as implement coupler block 210, a port such as port 134 is provided to accommodate such implements. In this embodiment, such a power machine would have two ports for coupling to the same power source: via a port such as port 134 and via implement carrier 200. Such a power machine could not only provide for two different ways to providing for hydraulic and/or electrical communication with an implement, it is also now possible to provide communication to two different implements via each of these ports.

Figure 18:
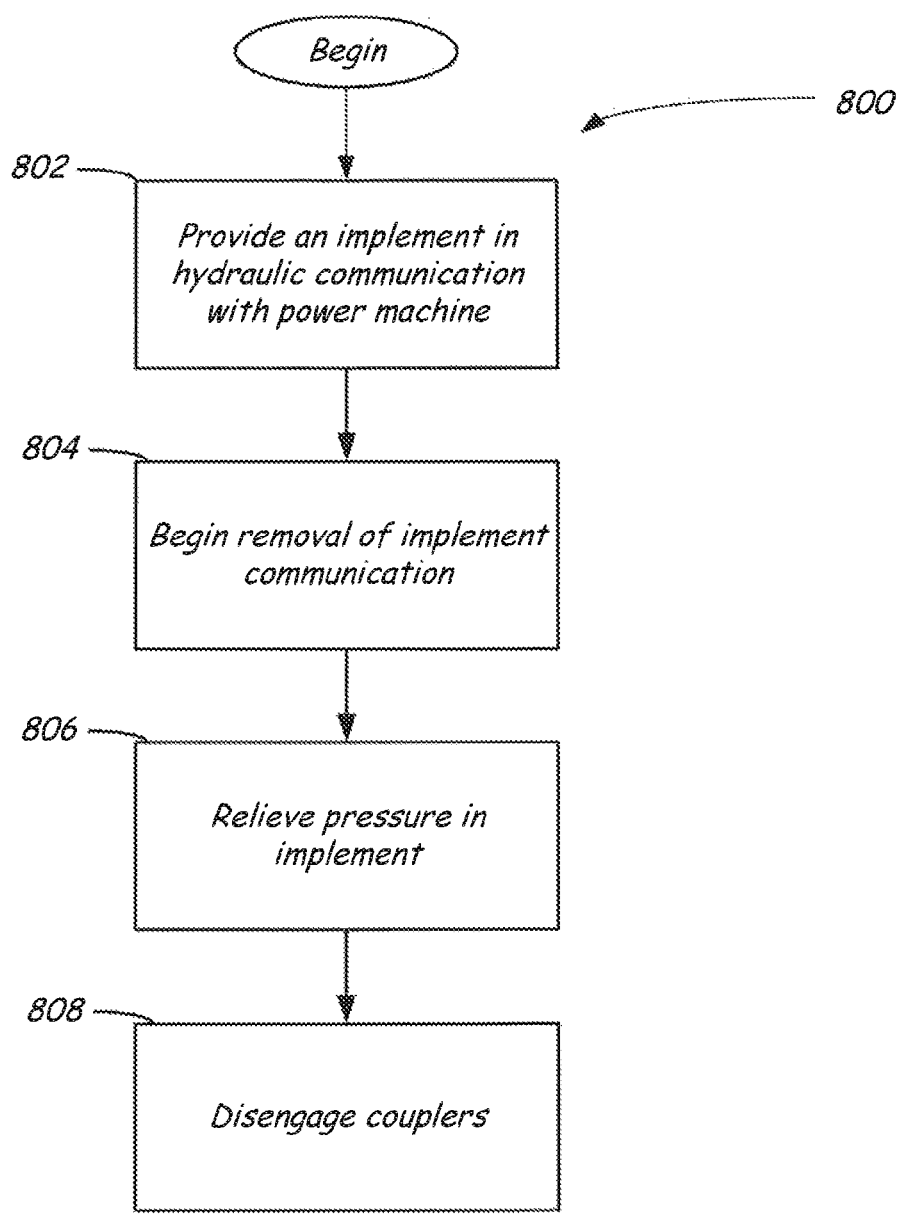
FIG. 18 is a flowchart illustrating a method of relieving pressure in the coupler assembly illustrated in FIGS. 14-17 according to one illustrative embodiment.

FIG. 18 illustrates a method 800 of relieving pressure in a hydraulic circuit on an implement when the implement is disconnected from a power machine from which it was selectively receiving pressurized hydraulic fluid. The method 800 is discussed with respect to the embodiments discussed above with respect to FIGS. 12-17, including coupler assembly 600 and coupler block 500. The method begins at block 802, where an implement is provided in hydraulic communication with a power machine. The implement in question includes a coupler assembly such as coupler assembly 600 that is fully coupled to a power machine via a coupler block such as coupler block 500 (or, in some embodiments a coupler block with features such as those described above with respect to coupler block 210). FIG. 17 illustrates an example of fully engaged couplers.

The method continues at block 804, where the process of removing the implement from the power machine has begun. More particularly, the method at block 804 is directed at removing communication of pressurized hydraulic fluid between the power machine and the implement. In FIGS. 15-16, the couplers 640 and 540 are shown in different stages of disengagement. In FIG. 16, the flow path between the couplers 640 and 540 is reduced, as discussed above. In FIG. 15, the flow path between the couplers 640 and 540 is eliminated. At this point, pressurized hydraulic fluid cannot move between the couplers, but the couplers are still engaged and the implement remains under pressure.

At block 806, the method includes relieving pressure in the implement. This includes providing a path to the fluid relief path 654 by allowing the couplers to disengage enough to urge the seal member 672 out of the fluid relief path. This is accomplished while the couplers are still partially engaged. Pressurized fluid is allowed to enter the fluid relief path 654, thereby lowering the pressure of fluid in the implement. Although not shown in the figures, the fluid relief path in some embodiments can include an accumulator with a relatively low spring rate to receive pressure and allow additional volume in the fluid relief path. The fluid relief path can also include flexible hose that is capable of expanding and increasing the volume in the fluid relief path. At block 808, the couplers are disengaged and the implement is removed from the implement carrier, leaving the implement with a hydraulic circuit that has a substantially reduced pressure, making subsequent coupling of the hydraulic system to a power machine easier because of the relieved pressure.

Figure 19:
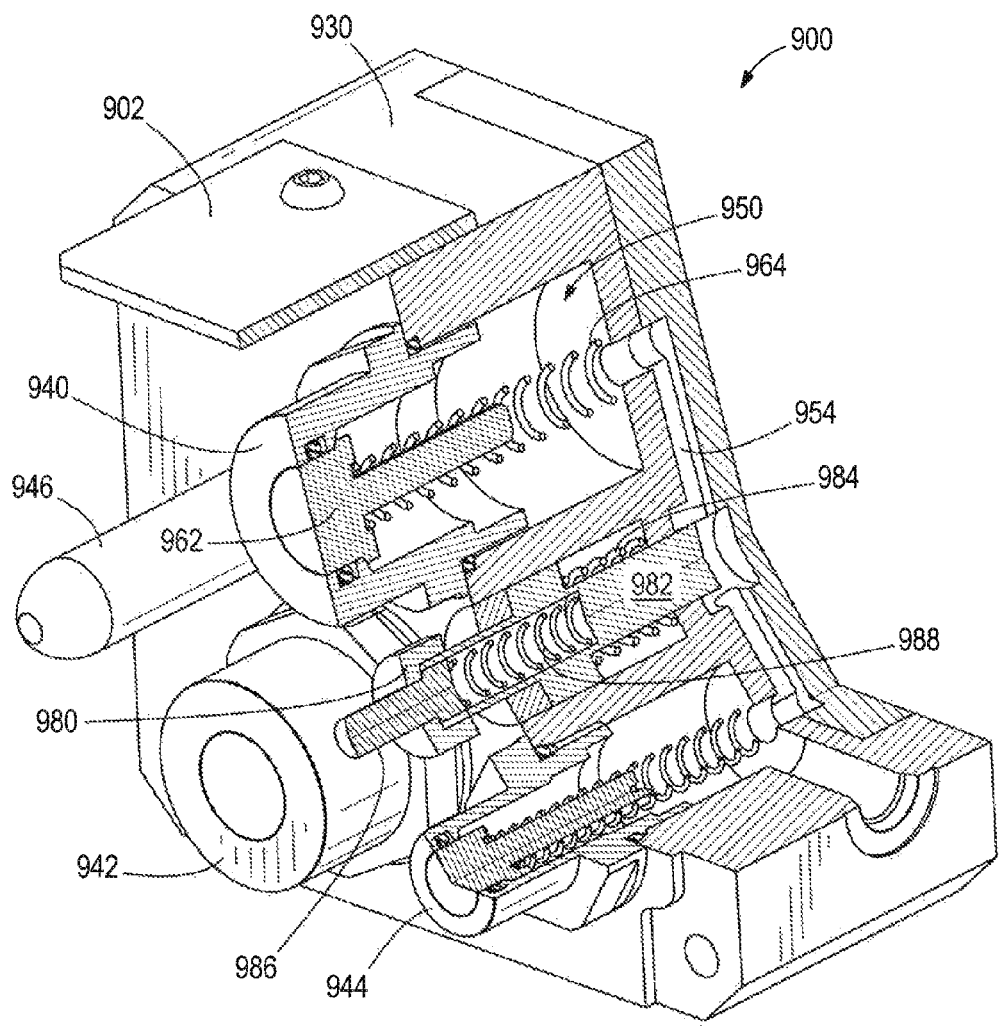
FIG. 19 is a cross-sectional perspective view of a coupler assembly configured to be engaged with and connected to the coupler block of FIG. 12 according to another illustrative embodiment, the cross section taken across two couplers and an internal blocking valve.

FIG. 19 illustrates a coupler assembly 900 capable of relieving internal hydraulic pressure on an implement according to yet another illustrative embodiment. Coupler assembly 900 includes a housing 930, with a plurality of couplers 940, 942, and 944 that are configured to be engaged with a coupler block on an implement carrier such as coupler block 500. Similar features as those illustrated and discussed above relative to coupler assembly 600 are numbered similarly, and are not discussed here for the sake of brevity (i.e. debris shield 902 corresponds to debris shield 602). Coupler 940, unlike coupler 640, does not include a valve member with a seal on an end thereof that is operable to open and close fluid relief path 954. Instead, coupler assembly 900 includes a relief valve assembly 980 that is independent of any coupler on the coupler assembly 900. Relief valve assembly 980 includes a valve member 982 biased into an open position as shown in FIG. 19 by a biasing member 984 in the form of a compression spring. The valve member 982 is operably coupled to a plunger 986 that is capable of moving from a fully extended position as shown in FIG. 19 into a retracted position within the valve member 982. The plunger 986 is biased to the fully extended position by a biasing member 988 in the form of a compression spring, the biasing member 988 having, in one embodiment, a higher biasing force than the biasing member 984. When the plunger is fully extended, it extends beyond a front face of the couplers 940, 942, and 944.

Figure 20:
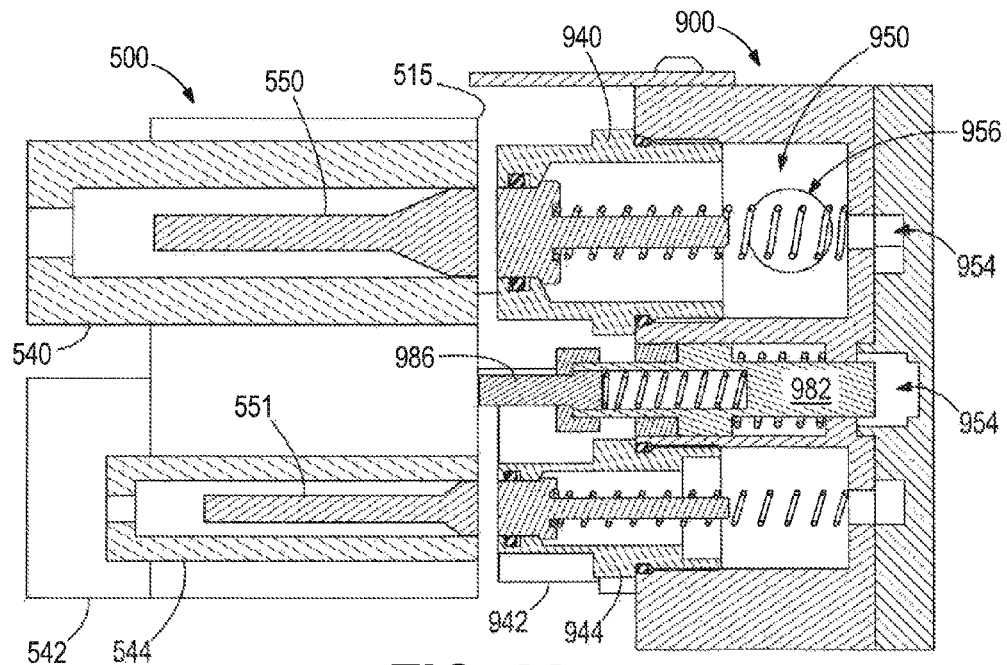
FIG. 20 illustrates a cross-sectional view of the coupler assembly of FIG. 19 aligned with the coupler block of FIG. 12.
Figure 21:
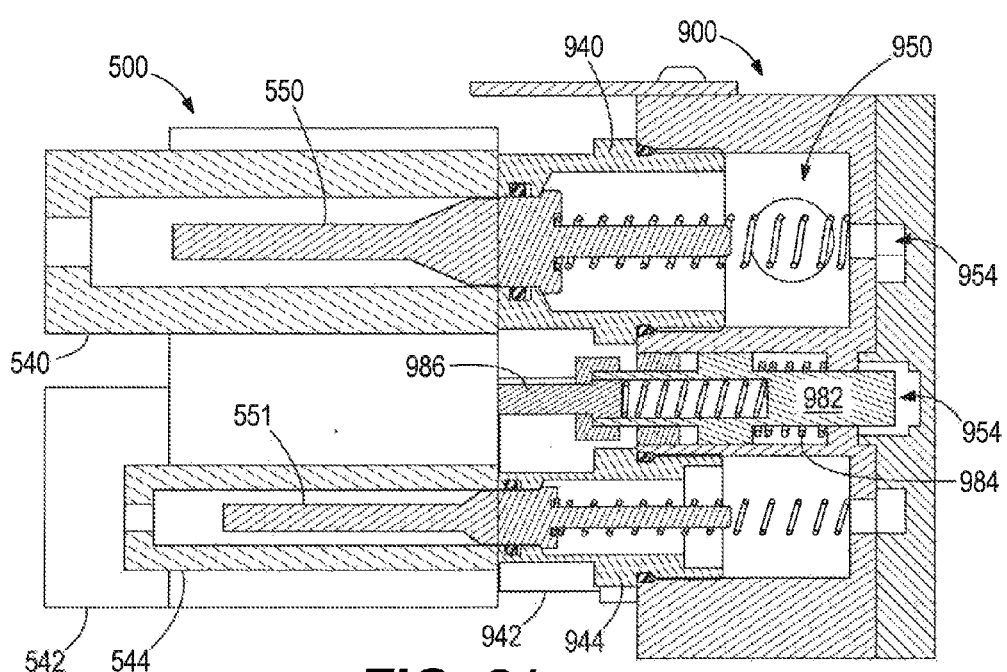
FIGS. 21-23 illustrate the coupler block and coupler assembly of FIG. 20 in various states of engagement.
Figure 22:
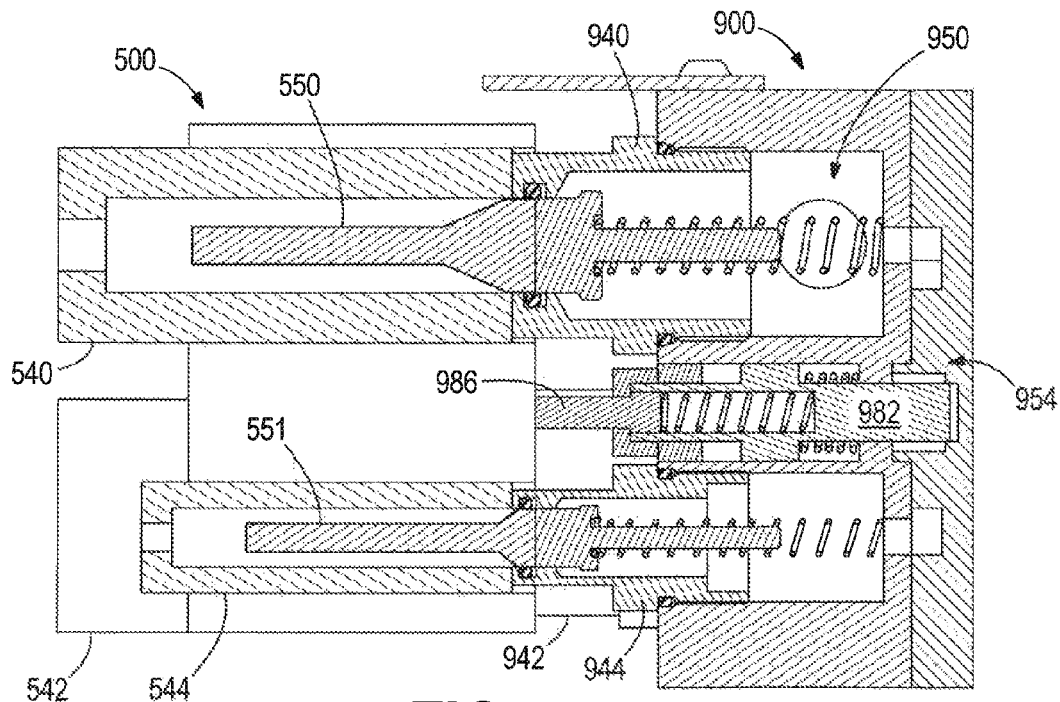
Figure 23:
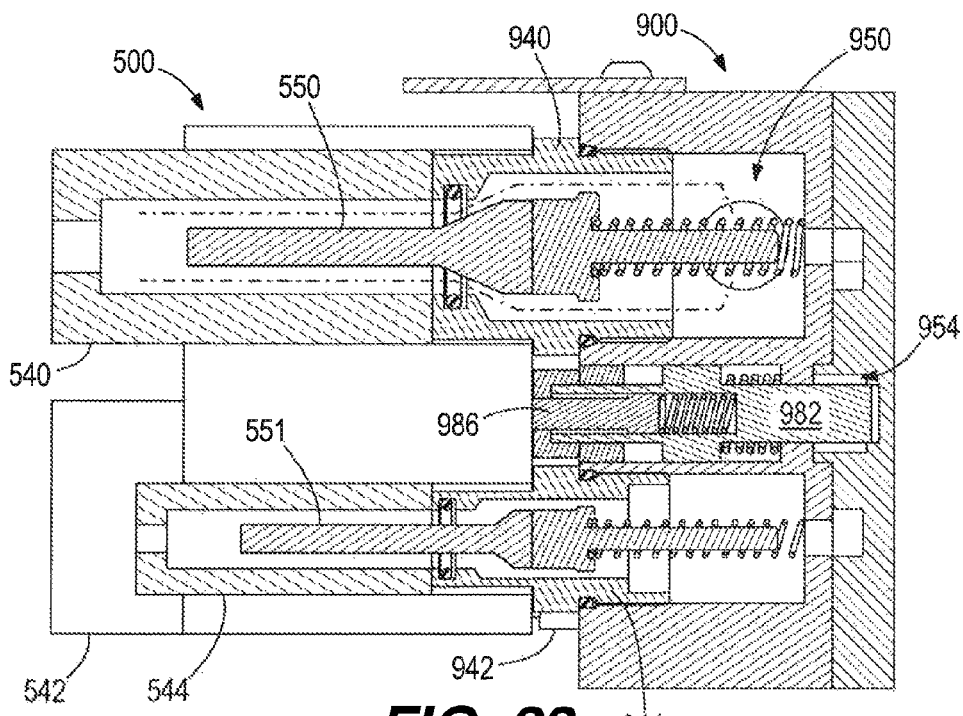

FIGS. 20-23 show the coupler assembly 900 aligned with coupler block 500 in various stages of engagement. In FIG. 20, the coupler block 500 is adjacent the coupler assembly 900 such that the front face 515 of the coupler block is in contact with the plunger 986, but has not overcome any internal biasing member. Cavity 950 is in communication with fluid relief path 954, thereby causing pressure relief in the hydraulic circuit. In FIG. 21, the coupler block 500 and coupler assembly 900 have moved closer together, thereby applying a force on the plunger and causing the valve member 982 to begin to overcome biasing member 984 such that the valve member 982 begins to enter the fluid relief port 954. Couplers 540 and 940 are adjacent to each other but are not yet engaged. In FIG. 22, the valve member 982 is fully seated into fluid relief path 954 and couplers 540 and 940 have begun to engage, but at most only minimal flow is flowing between coupler 540 and cavity 950. The valve member 982 is intended to be fully seated, i.e., the valve member is intended to block the fluid relief path 954 before any fluid is communicated between the coupler 540 and the cavity 950. In FIG. 23, the valve member 982 is fully seated, the plunger 986 is retracted and the couplers 540 and 940 are fully engaged, allowing adequate flow to the hydraulic circuit on an implement.

Figure 24:
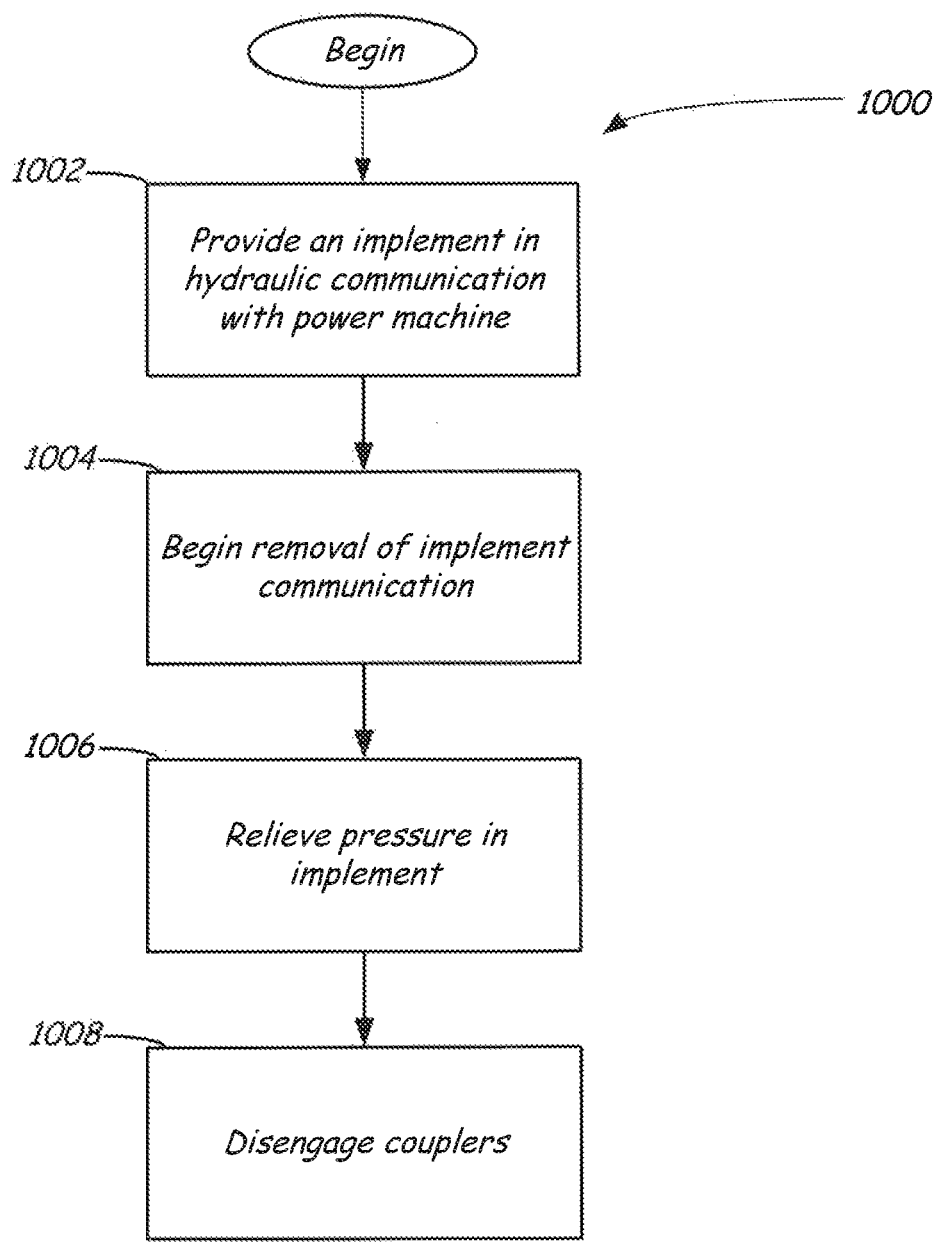
FIG. 24 is a flowchart illustrating a method of relieving pressure in the coupler assembly illustrated in FIGS. 20-23 according to an illustrative embodiment.

FIG. 24 illustrates a method 1000 of relieving pressure in a hydraulic circuit on an implement when the implement is disconnected from a power machine from which it was selectively receiving pressurized hydraulic fluid. The method 1000 is discussed with respect to the embodiments discussed above with respect to FIGS. 19-23, including coupler assembly 900 and coupler block 500. The method begins at block 1002, where an implement is provided in hydraulic communication with a power machine. The implement in question includes a coupler assembly such as coupler assembly 900 that is fully coupled to a power machine via a coupler block such as coupler block 500 (or, in some embodiments a coupler block with features such as those described above with respect to coupler block 210). FIG. 23 illustrates an example of fully engaged couplers. As discussed above, fully engaged means adequate hydraulic fluid flow for normal operation of implement, not necessarily the position of the coupler blocks relative to each other.

The method continues at block 1004, where the process of removing the implement from the power machine has begun. More particularly, the method at block 1004 is directed at removing communication of pressurized hydraulic fluid from the implement. In FIGS. 21-22, the couplers 540 and 940 are shown in different stages of disengagement. In FIG. 22, the flow path between the couplers 540 and 940 is reduced, as discussed above. In FIG. 21, the flow path between the couplers 540 and 940 is eliminated. At this point, pressurized hydraulic fluid cannot move between the couplers, but the couplers are still engaged and the implement remains under pressure.

At block 1006, the method includes relieving pressure in the implement. This includes providing a path to the fluid relief path 954 by disengaging the coupler block 500 from the coupler assembly 900 far enough to allow the biasing member 984 to urge the valve member 982 out of the fluid relief path 954, thereby increasing fluid path or cavity volume in the implement and thereby lowering the pressure of fluid in the implement. Although not shown in the figures, the fluid relief path in some embodiments can include an accumulator with a relatively low spring rate to receive pressure and allow additional volume in the fluid relief path. The fluid relief path can also include flexible hose that is capable of expanding and increasing the volume in the fluid relief path. At block 1008, the couplers are disengaged and the implement is removed from the implement carrier, leaving the implement with a hydraulic circuit that has a substantially reduced pressure, making subsequent coupling of the hydraulic system to a power machine easier because of the relieved pressure.

Figure 25:
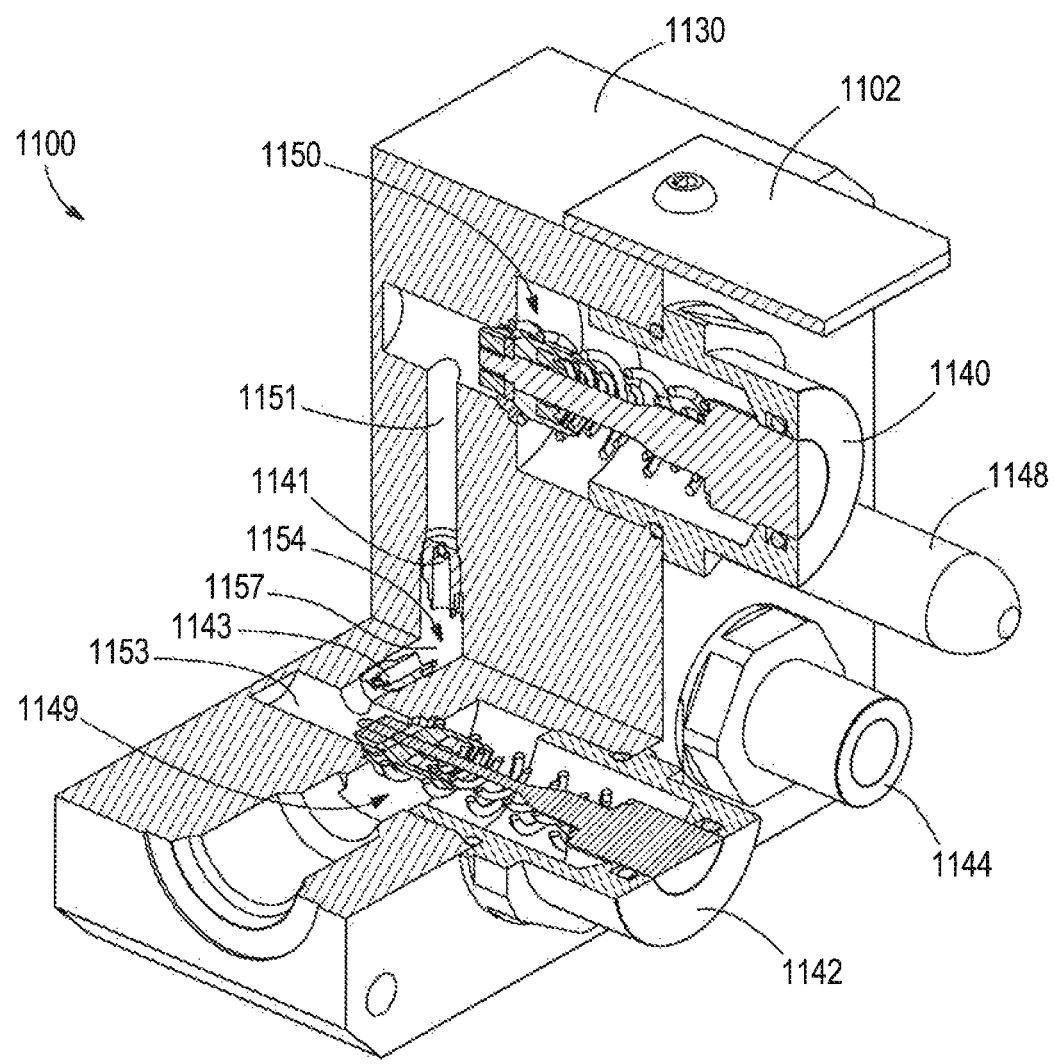
FIG. 25 is a cross-sectional view of a coupler assembly configured to be engaged with and connected to the coupler of FIG. 12 according to another illustrative embodiment, the cross section being taken across two hydraulic couplers.

FIG. 25 illustrates a cross section of a coupler block 1100 capable of relieving internal pressure on an implement according to another illustrative embodiment. Coupler assembly 1100 includes a housing 1130, with a plurality of couplers 1140, 1142, and 1144 that are configured to be engaged with a coupler block on an implement carrier such as coupler block 500. Similar features as those illustrated and discussed above relative to coupler assembly 600 are numbered similarly, and are not discussed here for the sake of brevity (i.e. couplers 1140, 1142, and 1144 correspond to couplers 640, 642, and 644, respectively).

The cross section shown in FIG. 25 is taken across couplers 1140 and 1142 and shows a portion of relief path 1154 extending from each of the couplers 1140 and 1142. A pair of check valves 1141 and 1143 is positioned in fluid relief path 1154. The fluid relief path 1154 thus includes a first portion 1151, located between coupler 1140 and check valve 1141, a second portion 1153, located between coupler 1142 and check valve 1143, and a third, or common portion 1157, located between the check valves 1141 and 1143, which can include an accumulator (not shown) and a communication path toward coupler 1144 (not shown). The check valves 1141 and 1143 operate to allow the flow of fluid out of cavities 1150 and 1149, through the first and second portions 1151 and 1153 and into the third or common portion 1157. The check valves 1141 and 1143 also operate to block flow from passing from the third portion 1157 of the relief path 1154 to the first and second portions 1151 and 1153 of the relief path. These check valves thus advantageously allow for relief of hydraulic fluid pressure in an implement that is being removed from a power machine while simultaneously preventing the migration of pressurized hydraulic fluid from one of couplers 1140 and 1142 to the other, which may be undesirable in some implements. While other embodiments of coupler blocks shown above do not include check valves such as check valves 1141 and 1143 or can include other valving arrangements, such as a shuttle valve with inputs form the first and second portions 1151 and 1153 and an output to the third portion 1157, other embodiments not specifically detailed herein can include the features of previous embodiments and similarly positioned check valves or other valving arrangements. Check valves 1141 and 1143 as shown in FIG. 25 do not include any biasing elements, and instead rely on pressure built up in the various portions of the relief path 1154 to position a check valve seat in each of the check valves accordingly. In other embodiments, such check valves can include a biasing element to bias the check valves into a given position.

As discussed above, coupler assembly 1100 is capable of being coupled with a coupler block on an implement carrier such as coupler block 500. Such a coupling can be accomplished by methods such as methods 800 and 1000 described above, with the additional feature of allowing flow into the common portion 1157 of the relief path and preventing flow from the common portion 1157 into either of the first portion 1151 and the second portion 1153. Fluid stored in the common portion 1157 and related pressure can be relieved out of coupler 1144 when an implement is coupled to a power machine and can optionally include a device such as an accumulator to provide additional capacity to lower hydraulic pressure.

The embodiments above provide several advantages. For example, the disclosed embodiments allow for an automated coupling of hydraulic and/or electrical couplers on an implement in line with an implement carrier to a power machine as part of the mounting process of the implement to the power machine and without additional powered actuators to make the connection. Various embodiments include various features that allow for a robust connection process and fully engaged couplers. In addition, the embodiments above disclose apparatuses and methods for relieving pressure that would be otherwise trapped in an implement when it is disconnected from a power machine. This allows for easier reconnections when trying to connect to a machine. The embodiments provide for the ability to connect a power machine equipped with the implement carriers described above to implements that do not have hydraulic functions, such as simple buckets and also to couple to implements that have hydraulic functions but are not equipped to connect to a coupler block of the type disclosed above.

Although the present invention has been described with reference to preferred embodiments, workers skilled in the art will recognize that changes may be made in form and detail without departing from the scope of the discussion.

What is claimed is:

1. An implement carrier configured to be mounted to a power machine, the implement carrier being configured to receive and secure an implement for use with the power machine, comprising:
   an implement carrier frame;
   a locking feature for securing the implement to the implement carrier frame; and
   a coupler block having a first plurality of couplers mounted therein for engagement with a second plurality of couplers on the implement to provide a power source for the implement,
   wherein the coupler block is pivotally mounted to the implement carrier frame such that the coupler block freely rotates around an axis.

2. The implement carrier of claim 1, wherein the coupler block freely rotates around the axis in either of two directions without restraint.

3. The implement carrier of claim 1, wherein the frame includes an engagement feature for engaging the implement such that when the implement is being received, the implement is intended to be engaged by the engagement feature and subsequently secured by the locking feature.

4. The implement carrier of claim 1 wherein the coupler block has a housing and a moveable member located within the housing, the first plurality of couplers being fixed to the moveable member such that movement of the moveable member causes the first plurality of couplers to move relative to the housing.

5. The implement carrier of claim 1, wherein at least one of the first plurality of couplers is configured to provide pressurized hydraulic fluid to the implement after the implement has been received and secured.

6. The implement carrier of claim 1, wherein the implement carrier frame has a front side and an opposing rear side and wherein the coupler block is pivotally mounted to the rear side of the implement carrier frame and the first plurality of couplers is accessible from the front side of the implement carrier frame.

7. The implement carrier of claim 6, wherein the implement carrier frame has an aperture through which access to the first plurality of couplers is provided.

8. The implement carrier of claim 1, wherein the implement carrier frame has a generally flat surface against which the implement is positionable and wherein the coupler block has a front face on which the first plurality of couplers is accessible, the front face being configured to be positioned generally parallel with the flat surface of the implement frame when the implement is locked to the implement carrier frame.

9. The implement carrier of claim 1, wherein the coupler block pivots freely until locked from an actuator.

10. The implement carrier of claim 1, further comprising a plate with a planar surface, wherein the pivotal mounting of the coupler block is behind the plate with the first plurality of couplers accessible through the plate.

11. The implement carrier of claim 10 wherein the implement carrier frame includes an alignment feature that includes an aperture for alignment of the implement with the implement carrier, and wherein the alignment feature is on the plate.

12. A power machine, comprising:
   a frame;
   a power source supported by the frame;
   a lift arm pivotally mounted to the frame; and an implement carrier pivotally mounted to the lift arm, the implement carrier being configured to receive and secure an implement for use with the power machine, the implement carrier including a locking mechanism for securing the implement and a plurality of couplers configured to be engaged with the implement to provide a power signal from the power source to the implement;

wherein the implement carrier is further configured so that receiving and securing the implement also causes the plurality of couplers on the implement carrier to be aligned and engaged with the implement; and wherein the plurality of couplers freely rotates around an axis.

13. The power machine of claim 12, wherein the implement carrier comprises:

an implement carrier frame; and a coupler assembly that houses the plurality of couplers, the coupler assembly being pivotally mounted to the implement carrier frame such that the coupler assembly is configured to rotate to align the plurality of couplers with corresponding couplers on the implement carrier.

14. An implement in combination with the power machine of claim 13, the implement comprising:

an implement carrier interface having a locking feature engaged by the locking mechanism and a plurality of implement couplers mounted thereon in engagement with the plurality of couplers on the implement carrier.

15. The power machine of claim 12, wherein at least one of the plurality of couplers is a hydraulic coupler.

16. The power machine of claim 13, wherein the coupler assembly has a moveable element configured to move the plurality of couplers within the coupler assembly.

17. The implement carrier of claim 12, wherein the first plurality couplers freely rotate around the axis in either of two directions without restraint.

18. The combination of claim 14, wherein the weight of the implement urges the plurality of implement couplers on the implement carrier interface into engagement with the plurality of couplers on the implement carrier.

19. A method of interfacing an implement with a power machine, comprising:

providing an implement carrier on the power machine capable of engaging and securing the implement to the power machine, the implement carrier having:
 a frame with a generally flat surface for engaging the implement;
 a coupler assembly housing a first plurality of couplers that provide a power source to the implement, the coupler assembly being positioned on a back side of the frame and the first plurality of couplers being accessible from a front side of the frame,
 wherein the coupler assembly is pivotally mounted to the frame such that the coupler assembly freely rotates around an axis; and
 a locking mechanism for securing the implement to the implement carrier;

aligning the implement carrier with and engaging the implement;

aligning the coupler assembly with a second plurality of couplers on the implement; and actuating the locking mechanism to secure the implement to the implement carrier.

20. The method of claim 19, wherein the coupler assembly is pivotally mounted to the frame of the implement carrier and aligning the coupler assembly with the second plurality of couplers on the implement includes providing a first locating member on the implement configured to engage a second locating member on the coupler assembly.

21. The method of claim 20, wherein engaging the second locating member on the coupler assembly causes the coupler assembly to rotate with respect to the frame.

22. The method of claim 19, wherein aligning the implement carrier with and engaging the implement includes moving an engagement feature on the implement carrier into engagement with an engagement feature on the implement and causing the implement to rotate into an aligned position with the implement carrier.

23. The method of claim 19 and further comprising:

moving the first plurality of couplers on the coupler assembly to cause the first plurality of couplers to move closer to the second plurality of couplers on the implement.

24. The method of claim 19 and further comprising:

lifting the implement to allow the weight of the implement to urge the second plurality of couplers on the implement into engagement with the first plurality of couplers on the coupler assembly.

25. The method of claim 19 wherein providing the implement carrier with the locking mechanism includes providing an actuator for manipulating the locking mechanism.

26. A method of interfacing an implement with a power machine, comprising:

providing an implement carrier on the power machine configured to engage and secure the implement to the power machine, the implement carrier having:
 a frame with a surface for engaging the implement;
 a coupler movably mounted to the frame that provides a power source to the implement, the coupler being positioned on a back side of the frame and accessible from a front side of the frame; and
 a locking mechanism for securing the implement to the implement carrier;

aligning the implement carrier with and engaging the implement;

causing the coupler mounted to the frame to align with a coupler on the implement positioned in front of the coupler mounted to the frame; and actuating the locking mechanism to secure the implement to the implement carrier.

27. The method of claim 26, wherein aligning the implement carrier with and engaging the implement includes moving an engagement feature on the implement carrier into engagement with an engagement feature on the implement and causing the implement to rotate into an aligned position with the implement carrier.

28. The method of claim 26, and further comprising:

lifting the implement to allow the weight of the implement to urge the coupler on the implement into engagement with the coupler on the implement carrier.

29. The method of claim 26, wherein providing the implement carrier with the locking mechanism includes providing an actuator for manipulating the locking mechanism.

30. An implement carrier configured to be mounted to a power machine, the implement carrier being configured to receive and secure an implement for use with the power machine, comprising:

an implement carrier frame configured to receive and secure an implement thereto; and a coupler block having at least one coupler mounted therein for engagement with at least one coupler on the implement to provide a power source for the implement, wherein the coupler block is mounted to the implement carrier frame such that the coupler block is configured to move freely in at least one direction relative to the implement carrier frame.

31. The implement carrier of claim 30, and further comprising a locking feature for securing the implement to the implement carrier frame, wherein the frame includes an engagement feature for engaging the implement such that when the implement is being received, the implement is engaged by the engagement feature and subsequently secured by the locking feature.

32. The implement carrier of claim 30, wherein the coupler block has a housing and a moveable member located within the housing, the at least one coupler mounted in the coupler block being fixed to the moveable member such that movement of the moveable member causes the at least one coupler mounted in the coupler block to move relative to the housing.

33. The implement carrier of claim 30, wherein the at least one coupler includes a first coupler mounted in the coupler block and configured to provide pressurized hydraulic fluid to the implement after the implement has been received and secured.

34. The implement carrier of claim 30, wherein the implement carrier frame has a front side and an opposing rear side and wherein the coupler block is pivotally mounted on the rear side of the implement carrier frame and the at least one coupler mounted in the coupler block is accessible from the front side of the implement carrier frame.

35. The implement carrier of claim 34, wherein the implement carrier frame has an aperture through which access to the at least one coupler mounted in the coupler block is provided.

36. The implement carrier of claim 30, wherein the implement carrier frame has a generally flat surface against which the implement is positionable and wherein the coupler block has a front face on which the at least one coupler mounted in the coupler block is accessible, the front face being configured to be positioned generally parallel with the generally flat surface of the implement carrier frame when the implement is locked to the implement carrier frame.

37. The implement carrier of claim 30, wherein the coupler block is pivotally mounted to the implement carrier frame and moves freely with respect to the implement carrier frame without control of an actuator.

38. The implement carrier of claim 30, wherein the coupler block is configured to freely move in the at least one direction without restraint.

39. The implement carrier of claim 30, further comprising a plate with a planar surface, wherein the mounting of the coupler block is behind the plate with the at least one coupler of the coupler block accessible through the plate.

40. The implement carrier of claim 35, wherein the implement carrier frame includes an alignment feature on the plate that includes an aperture for alignment of the implement with the implement carrier.

41. A power machine, comprising:
a frame;
a power source supported by the frame;
a lift arm pivotally mounted to the frame; and
an implement carrier pivotally mounted to the lift arm, the implement carrier being configured to receive and secure an implement for use with the power machine, the implement carrier including a locking mechanism for securing the implement and at least one coupler configured to be aligned and engaged with the implement when received and secured to provide a power signal from the power source to the implement, and wherein the at least one coupler is configured to move freely relative to another portion of the implement carrier in response to engagement from the implement.

42. The power machine of claim 41, wherein the implement carrier further comprises:
an implement carrier frame; and
a coupler assembly that houses the at least one coupler, the coupler assembly being mounted to the implement carrier frame such that the coupler assembly is configured to move relative to the implement carrier frame to align the at least one coupler with a corresponding at least one coupler on the implement when the implement is received and secured.

43. The power machine of claim 41, wherein the at least one coupler includes at least one hydraulic coupler.

44. The power machine of claim 41, wherein the at least one coupler includes at least one electrical coupler.

45. An implement in combination with the power machine of claim 41, the implement comprising:
an implement carrier interface having a locking feature engaged by the locking mechanism and at least one implement coupler mounted thereon in engagement with the at least one coupler of the implement carrier.

46. The combination of claim 45, wherein the implement includes an implement coupler assembly in which the at least one implement coupler is mounted.

47. The combination of claim 46, wherein the at least one coupler of the implement carrier is configured to relieve hydraulic pressure when the implement is removed from the implement carrier.

48. The combination of claim 45, wherein the weight of the implement urges the at least one implement coupler on the implement carrier interface into engagement with the at least one coupler of the implement carrier.

49. A method of interfacing an implement with a power machine, comprising:
providing an implement carrier on the power machine configured to engage and secure the implement to the power machine, the implement carrier having:
a frame with a surface for engaging the implement; and
a coupler movably mounted to the frame that provides a power source to the implement, the coupler being positioned on a back side of the frame and accessible from a front side of the frame; and
aligning the implement carrier with and engaging the implement, comprising lifting the implement to allow the weight of the implement to urge the coupler on the implement into engagement with the coupler on the implement carrier.

50. An implement carrier configured to be mounted to a power machine, the implement carrier being configured to receive and secure an implement for use with the power machine, comprising:
an implement carrier frame configured to receive and secure an implement thereto; and
a coupler block having at least one coupler mounted therein for engagement with at least one coupler on the implement to provide a power source for the implement;
wherein the coupler block is mounted to the implement carrier frame such that the coupler block is configured to move relative to the implement carrier frame;
wherein the implement carrier frame has a front side and an opposing rear side and wherein the coupler block is pivotally mounted on the rear side of the implement carrier frame and the at least one coupler mounted in the coupler block is accessible from the front side of the implement carrier frame.

51. The implement carrier of claim 50, wherein the implement carrier frame has an aperture through which access to the at least one coupler mounted in the coupler block is provided.

52. The implement carrier of claim 50, wherein the implement carrier frame has a generally flat surface against which the implement is positionable and wherein the coupler block has a front face on which the at least one coupler mounted in the coupler block is accessible, the front face being configured to be positioned generally parallel with the generally flat surface of the implement carrier frame when the implement is locked to the implement carrier frame.

* * * * *